US010601556B2

(12) United States Patent
Teyeb et al.

(10) Patent No.: US 10,601,556 B2
(45) Date of Patent: Mar. 24, 2020

(54) MEASUREMENT GAP CONFIGURATION

(71) Applicant: Telefonaktiebolaget LM Ericsson (publ), Stockholm (SE)

(72) Inventors: Oumer Teyeb, Solna (DE); Icaro L. J. da Silva, Solna (SE); Rui Fan, Beijing (CN); Helka-Liina Määttanen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/255,188

(22) Filed: Jan. 23, 2019

(65) Prior Publication Data
US 2019/0173634 A1    Jun. 6, 2019

Related U.S. Application Data

(63) Continuation of application No. PCT/EP2018/051180, filed on Nov. 15, 2018.

(60) Provisional application No. 62/587,398, filed on Nov. 16, 2017.

(51) Int. Cl.
*H04L 5/00* (2006.01)
*H04B 7/022* (2017.01)
*H04W 36/00* (2009.01)
*H04W 72/04* (2009.01)
(Continued)

(52) U.S. Cl.
CPC .......... *H04L 5/0032* (2013.01); *H04B 7/022* (2013.01); *H04W 36/0069* (2018.08); *H04W 36/0088* (2013.01); *H04W 72/0453* (2013.01); *H04W 72/085* (2013.01); *H04W 88/06* (2013.01)

(58) Field of Classification Search
CPC ............ H04L 5/0032; H04W 72/0453; H04W 72/085; H04W 36/0069; H04W 36/0088; H04W 88/06; H04B 7/022
See application file for complete search history.

(56) References Cited

U.S. PATENT DOCUMENTS 8,965,414 B2 *  2/2015  Siomina ................ H04W 24/10
                                                              455/456.6
9,392,512 B2 *  7/2016  Su ...................... H04W 36/0085
9,729,175 B2 *  8/2017  Tang ..................... H04W 24/10
(Continued)

FOREIGN PATENT DOCUMENTS

WO    2016164782 A1    10/2016

OTHER PUBLICATIONS

Unknown, Author, "Discussion on measurement gaps for NR", 3GPP TSG-RAN WG4 Meeting #84, R4-1707459, Berlin, Germany, Aug. 21-25, 2017, pp. 1-4.
(Continued)

*Primary Examiner* — Dung B Huynh
(74) *Attorney, Agent, or Firm* — Murphy, Bilak & Homiller, PLLC

(57) ABSTRACT

According to certain embodiments, disclosed is a method performed by a master node, MN, (160A) for measurement gap configuration. The method may include operating in a dual connectivity, DC, configuration with a secondary node, SN, (160B) and a wireless device (110). The method may further include configuring the wireless device (110) with a measurement gap configuration, wherein the measurement gap configuration allows the wireless device (110) to measure a first frequency range, FR1, and a second frequency range, FR2.

16 Claims, 16 Drawing Sheets

(51) Int. Cl.
*H04W 72/08* (2009.01)
*H04W 88/06* (2009.01)

(56) References Cited

U.S. PATENT DOCUMENTS

| | | | | |
|---|---|---|---|---|
| 2012/0083278 | A1* | 4/2012 | Kazmi | H04W 36/06 |
| | | | | 455/440 |
| 2013/0016690 | A1* | 1/2013 | Jeong | H04W 24/10 |
| | | | | 370/329 |
| 2013/0215736 | A1* | 8/2013 | Han | H04L 5/001 |
| | | | | 370/216 |
| 2015/0223212 | A1* | 8/2015 | Der Velde | H04L 5/0032 |
| | | | | 370/329 |
| 2015/0289153 | A1* | 10/2015 | Gopal | H04W 24/08 |
| | | | | 455/436 |
| 2015/0326371 | A1* | 11/2015 | Baek | H04L 5/00 |
| | | | | 455/450 |
| 2015/0327104 | A1* | 11/2015 | Yiu | H04W 24/10 |
| | | | | 455/450 |
| 2015/0327322 | A1* | 11/2015 | Huang | H04W 24/10 |
| | | | | 370/329 |
| 2016/0056939 | A1* | 2/2016 | Kim | H04L 5/0098 |
| | | | | 370/331 |
| 2016/0192433 | A1* | 6/2016 | Deenoo | H04W 72/046 |
| | | | | 370/329 |
| 2016/0219475 | A1* | 7/2016 | Kim | H04L 5/00 |
| 2016/0249259 | A1* | 8/2016 | Park | H04W 36/00 |
| 2016/0337893 | A1* | 11/2016 | Gheorghiu | H04W 24/10 |
| 2016/0337916 | A1* | 11/2016 | Deenoo | H04W 8/22 |
| 2017/0006566 | A1* | 1/2017 | Zhang | H04W 56/004 |
| 2017/0048108 | A1 | 2/2017 | Yi et al. | |
| 2017/0086110 | A1* | 3/2017 | Wu | H04W 36/0088 |
| 2017/0134976 | A1* | 5/2017 | Uchino | H04W 16/32 |
| 2017/0150387 | A1* | 5/2017 | Fujishiro | H04W 16/14 |
| 2017/0171768 | A1* | 6/2017 | Kim | H04L 5/001 |
| 2017/0223762 | A1* | 8/2017 | Worrall | H04W 24/10 |
| 2017/0251460 | A1* | 8/2017 | Agiwal | H04W 72/0406 |
| 2017/0265172 | A1* | 9/2017 | Futaki | H04W 16/14 |
| 2017/0359632 | A1* | 12/2017 | Qu | H04W 36/0085 |
| 2018/0034598 | A1* | 2/2018 | Yiu | H04W 24/10 |
| 2018/0069606 | A1* | 3/2018 | Jung | H04B 7/0408 |
| 2018/0084448 | A1* | 3/2018 | Yang | H04L 5/00 |
| 2018/0091196 | A1* | 3/2018 | Frenne | H04B 7/0408 |
| 2018/0109302 | A1* | 4/2018 | Nagaraja | H04B 7/08 |
| 2018/0124656 | A1* | 5/2018 | Park | H04W 36/0022 |
| 2018/0132124 | A1* | 5/2018 | Huang | H04W 24/10 |
| 2018/0255472 | A1* | 9/2018 | Chendamarai Kannan | |
| | | | | H04W 24/08 |
| 2018/0302818 | A1* | 10/2018 | Wu | H04W 24/08 |
| 2018/0302891 | A1* | 10/2018 | Bitra | H04W 4/90 |
| 2018/0359790 | A1* | 12/2018 | Ingale | H04W 8/24 |
| 2018/0367281 | A1* | 12/2018 | Kim | H04L 5/0098 |
| 2019/0021017 | A1* | 1/2019 | Nagaraja | H04W 24/10 |
| 2019/0059105 | A1* | 2/2019 | Harada | H04W 16/14 |
| 2019/0075585 | A1* | 3/2019 | Deogun | H04W 72/1273 |
| 2019/0090151 | A1* | 3/2019 | Yiu | H04W 24/10 |
| 2019/0124533 | A1* | 4/2019 | Tenny | H04W 24/10 |

OTHER PUBLICATIONS

Unknown, Author, "Measurement Gap Configuration in MR-DC", 3GPP TSG-RAN2 Meeting 99bis, R2-1710236, Prague, Czech Republic, Oct. 9-13, 2017, pp. 1-4.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.2, Apr. 2017, 1-721.

* cited by examiner

MEASUREMENT GAP CONFIGURATION

RELATED APPLICATIONS

This application is a continuation of International Patent Application No. PCT/SE2018/051180, filed Nov. 15, 2018, which claims the benefit of U.S. Provisional Patent Application No. 62/587,398, filed Nov. 16, 2018, each of which is incorporated by reference in its entirety herein.

TECHNICAL FIELD

Embodiments of the present disclosure are directed to wireless communications and, more particularly, to measurement gap configuration in a multi-radio access network dual connectivity (MR-DC) configuration.

BACKGROUND

In multicarrier or carrier aggregation (CA) operation, the UE is able to receive and/or transmit data to more than one serving cells. In other words a CA capable UE can be configured to operate with more than one serving cell. The carrier of each serving cell is generally called a component carrier (CC). Said differently, the component carrier (CC) is an individual carrier in a multi-carrier system. The carrier aggregation (CA) is interchangeably referred to as a "multi-carrier system", "multi-cell operation", "multi-carrier operation", "multi-carrier" transmission and/or reception. This means the CA is used for transmission of signaling and data in the uplink and downlink directions. One of the CCs is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

Generally, the primary or anchor CC carries the essential UE specific signaling. The primary CC (aka PCC or PCell) exists in both uplink and downlink directions in CA. In case there is single UL CC the PCell is on that CC. The network may assign different primary carriers to different UEs operating in the same sector or cell.

In dual connectivity (DC) operation the UE can be served by at least two nodes called master eNB (MeNB) and secondary eNB (SeNB). More generally, in multiple connectivity (aka multi-connectivity) operation the UE can be served by two or more nodes where each node operates or manages one cell group e.g. MeNB, SeNB1, SeNB2 and so on. More specifically, in multi-connectivity each node serves or manages at least secondary serving cells belonging its own cell group. Each cell group contains one or more serving cells. The UE is configured with PCC from both MeNB and SeNB. The PCell from MeNB and SeNB are called as PCell and PSCell respectively. The UE is also configured with one or more SCCs from each of MeNB and SeNB. The corresponding secondary serving cells served by MeNB and SeNB are called SCells. The UE in DC typically has separate TX/RX for each of the connections with MeNB and SeNB. This allows the MeNB and SeNB to independently configure the UE with one or more procedures e.g. radio link monitoring (RLM), DRX cycle etc. on their PCell and PSCell respectively.

In multi-connectivity all cell groups may contain serving cells of the same radio access technology (RAT), for example LTE, or different cell groups may contain serving cells of different RATs.

Dual Connectivity in LTE

E-UTRAN supports Dual Connectivity (DC) operation whereby a multiple Rx/Tx UE in RRC_CONNECTED is configured to utilize radio resources provided by two distinct schedulers, located in two eNBs connected, for example, via a non-ideal backhaul over the X2 interface. eNBs involved in DC for a certain UE may assume two different roles: an eNB may either act as an MN (Master node) or as a SN (Secondary node). In DC, a UE may be connected to one MN and one SN.

FIG. 1 illustrates and example LTE DC user plane, according to certain embodiments. In LTE DC, the radio protocol architecture that a particular bearer uses depends on how the bearer is setup. Three bearer types exist: MCG (Master Cell Group) bearer, SCG (Secondary Cell Group) bearer and split bearers. RRC is located in MN and SRBs (Signaling Radio Bearers) are configured as MCG bearer type and therefore only use the radio resources of the MN.

LTE-NR Dual Connectivity

LTE-NR (New Radio) DC (also referred to as LTE-NR tight interworking) is currently being discussed for rel-15. In this context, the major changes from LTE DC are:

The introduction of split bearer from the SN (known as SCG split bearer)

The introduction of split bearer for RRC

The introduction of a direct RRC from the SN (also referred to as SCG SRB or SRB3)

FIGS. 2 and 3 show the user plane (UP) and Control Plane (CP) architectures for LTE-NR tight interworking. FIG. 2 illustrates an example LTE-NR tight interworking in the user plane. FIG. 3 illustrates an example LTE-NR tight interworking in the CP. The SN is sometimes referred to as SgNB (where gNB is an NR base station), and the MN as MeNB in case the LTE is the master node and NR is the secondary node. In the other case where NR is the master and LTE is the secondary node, the corresponding terms are SeNB and MgNB Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG or both legs. The terms "leg" and "path" are used interchangeably throughout this document.

DC (Dual Connectivity): LTE DC (both MN and SN employ LTE)

EN-DC (E-UTRAN, New Radio DC): LTE-NR dual connectivity where LTE is the master and NR is the secondary NE-DC (New Radio, E-UTRAN DC): LTE-NR dual connectivity where NR is the master and LTE is the secondary NR-DC (or NR-NR DC): both MN and SN employ NR MR-DC (multi-RAT DC): a generic term to describe where the MN and SN employ different RATs (EN-DC and NE-DC are two different example cases of MR-DC)

In E-UTRAN-NR dual connectivity, the master cell group contains at least E-UTRA PCell while secondary cell group contains at least NR PSCell. In this example, master CG and secondary CG are managed by eNB and gNB respectively. In NR-E-UTRAN dual connectivity, the master cell group contains at least NR PCell while secondary cell group contains at least LTE PSCell. In this example, master CG and secondary CG are managed by gNB and eNB respectively.

Measurement Gaps in LTE

Inter-frequency measurements in LTE are conducted during periodic inter-frequency measurement gaps which are configured in such a way that each gap starts at an SFN and subframe meeting the following conditions:

SFN mod T=FLOOR(gapOffset/10);
subframe=gapOffset mod 10;

with T=MGRP/10, where MGRP stands for "measurement gap repetition period". E-UTRAN must provide a single measurement gap pattern with constant gap duration for concurrent monitoring of all frequency layers and RATs. Two configurations are supported by the UE, with MGRP of 40 and 80 ms, both with the measurement gap length (MGL) of 6 ms. In practice, due to the switching time, this leaves less than 6 but at least 5 full subframes for measurements within each such measurement gap. Shorter MGL has been recently also standardized in LTE.

In LTE, measurement gaps are configured by the network to enable measurements on the other LTE frequencies and/or other RATs. The gap configuration is signalled to the UE over RRC protocol as part of the measurement configuration. The gaps are common (i.e., shared by) for all frequencies, but the UE can measure only one frequency at a time within each gap.

In the RRC specifications, measurement gaps and procedures related to it may be described, for example, in TS 36.331 section 5.5.

5.5 Measurements
5.5.1 Introduction
The UE reports measurement information in accordance with the measurement configuration as provided by E-UTRAN. E-UTRAN provides the measurement configuration applicable for a UE in RRC_CONNECTED by means of dedicated signalling, i.e. using the RRCConnectionReconfiguration or RRCConnectionResume message.

. . .

5. Measurement gaps: Periods that the UE may use to perform measurements, i.e. no (UL, DL) transmissions are scheduled.
5.5.2 Measurement configuration
5.5.2.1 General

. . .

1>if the received measConfig includes the measGapConfig:
  2>perform the measurement gap configuration procedure as specified in 5.5.2.9;
5.5.2.9 Measurement gap configuration
The UE shall:
  1>if measGapConfig is set to setup:
    2>if a measurement gap configuration is already setup, release the measurement gap configuration;
    2>setup the measurement gap configuration indicated by the measGapConfig in accordance with the received gapOffset, i.e., the first subframe of each gap occurs at an SFN and subframe meeting the following condition (SFN and subframe of MCG cells):
    SFN mod T=FLOOR(gapOffset/10);
    subframe=gapOffset mod 10;
    with T=MGRP/10 as defined in TS 36.133 [16];
    NOTE: The UE applies a single gap, which timing is relative to the MCG cells, even when configured with DC.
  1>else:
    2>release the measurement gap configuration;

. . .

6.3.5 Measurement information elements

. . .

MeasConfig
The IE MeasConfig specifies measurements to be performed by the UE, and covers intra-frequency, inter-frequency and inter-RAT mobility as well as configuration of measurement gaps.

MeasConfig Information Element

```
-- ASN1START
MeasConfig ::=                    SEQUENCE {
    -- Measurement objects
    measObjectToRemoveList        MeasObjectToRemoveList        OPTIONAL,  -- Need ON
    measObjectToAddModList        MeasObjectToAddModList        OPTIONAL,  -- Need ON
    -- Reporting configurations
    reportConfigToRemoveList      ReportConfigToRemoveList      OPTIONAL,  -- Need ON
    reportConfigToAddModList      ReportConfigToAddModList      OPTIONAL,  -- Need ON
    -- Measurement identities
    measIdToRemoveList            MeasIdToRemoveList            OPTIONAL,  -- Need ON
    measIdToAddModList            MeasIdToAddModList            OPTIONAL,  -- Need ON
    -- Other parameters
    quantityConfig                QuantityConfig                OPTIONAL,  -- Need ON
    measGapConfig                 MeasGapConfig                 OPTIONAL,  -- Need ON
    s-Measure                     RSRP-Range                    OPTIONAL,  -- Need ON
    preRegistrationInfoHRPD       PreRegistrationInfoHRPD       OPTIONAL,  -- Need OP
    . . .
```

MeasGapConfig

The IE MeasGapConfig specifies the measurement gap configuration and controls setup/release of measurement gaps.

MeasGapConfig Information Element

```
-- ASN1START
MeasGapConfig :=           CHOICE {
    release                NULL,
    setup                  SEQUENCE {
        gapOffset              CHOICE {
            gp0                    INTEGER (0..39),
            gp1                    INTEGER (0..79),
            ...,
            gp2-r14                INTEGER (0..39),
            gp3-r14                INTEGER (0..79),
            gp-ncsg1-r14           INTEGER (0..39),
            gp-ncsg2-r14           INTEGER (0..79),
            gp-ncsg3-r14           INTEGER (0..39),
            gp-ncsg4-r14           INTEGER (0..79),
            gp-nonUniform1-r14     INTEGER (0..1279),
            gp-nonUniform2-r14     INTEGER (0..2559),
            gp-nonUniform3-r14     INTEGER (0..5119),
            gp-nonUniform4-r14     INTEGER (0.. 10239)
        }
    }
}
MeasGapConfig-r14 ::=SEQUENCE (SIZE (1..maxServCell-r13))
OF PerCC-MeasGapConfig-r14
PerCC-MeasGapConfig-r14 ::=    CHOICE {
    release                    SEQUENCE {
        servCellId-r14                         ServCellIndex-r13
    },
    setup                      SEQUENCE {
        servCellId-r14                         ServCellIndex-r13,
        measGapConfig-r14                      MeasGapConfig
    }
}
-- ASN1STOP
```

Inter-Frequency Measurements and Measurement Gaps in NR and EN-DC

3GPP has agreed that in NR there will be four MGRP (measurement gap repetition periods), 20 ms, 40 ms, 80 ms, 160 ms, as well as six options of MGL (measurement gap length), in total there will be 24 gap patterns. In the context of EN-DC, two frequency ranges (FR) are important to consider: FR1 (sub 6 Ghz) and FR2 (above 24 Ghz). LTE operates in FR1, while NR could operate in both FR1 and FR2. Depending on implementation, a UE may have one (a shared or common) RF chain for both FR1 and FR2 or a separate chain for each. In case of separate chains, inter-frequency measurement on one will not affect the transmission/reception on the other, while in the case of a common chain, measurements on one frequency range will require measurement gap and hence interruption of transmission/reception on the other. Thus, for the case of the separate RF chains, the UE could be configured with independent and different gap patterns, one for frequency of FR1, and one for frequency of FR2. On the other hand, for the common RF chain, a UE should be configured with one common (per UE) measurement gap. Whether a UE supports a separate or common RF chain for FR1 and FR2 is communicated to the network as part of the UE capability information exchange.

SUMMARY

To address the foregoing problems, disclosed is a method performed in a network node for measurement gap configuration. The network node may comprise processing circuitry operably coupled to interface circuitry. The processing circuitry may be configured to operate the network node as a master node in a dual connectivity configuration with a secondary node and a wireless device. The processing circuitry may be configured to configure a measurement gap configuration for the wireless device, wherein the measurement gap configuration allows the wireless device to measure a first frequency range (FR1) and a second frequency range (FR2). The interface circuitry may be configured to transmit the measurement gap configuration to the wireless device.

Also disclosed is a method performed by a master node (MN) for measurement gap configuration. The method includes operating in a dual connectivity (DC) configuration with a secondary node (SN) and a wireless device. The method further includes configuring the wireless device with a measurement gap configuration, wherein the measurement gap configuration allows the wireless device to measure a first frequency range (FR1) and a second frequency range (FR2).

In some embodiments, the method includes determining that the wireless device uses a shared radio frequency (RF) chain for FR1 and FR2. The method may also include communicating to the SN, that the SN does not have to setup the measurement gap configuration for the wireless device. In some embodiments, the method includes communicating the measurement gap configuration to the SN, the communication including an indication that the measurement gap configuration is for both FR1 and FR2. In certain embodiments, the method includes changing the measurement gap configuration of the wireless device to a new configuration and communicating the new configuration to the SN. In some embodiments, the method includes determining that wireless device will only measure FR1 and configuring the wireless device with a measurement gap configuration for FR1 frequencies. In some embodiments, the method includes determining that wireless device will only measure FR2 and configuring the wireless device with a measurement gap configuration for FR2 frequencies. In some embodiments, the method includes determining that wireless device will measure both FR1 and FR2 and configuring the wireless device with a measurement gap configuration for FR1 and FR2 frequencies. In certain embodiments, the DC configuration is a EN-DC configuration, the MN operates in LTE and the SN operates in NR.

Also disclosed is a master node (MN) for measurement gap configuration. The MN comprising processing circuitry operably coupled to an interface circuitry. The processing circuitry may be configured to operate in a dual connectivity (DC) configuration with a secondary node (SN). The processing circuitry may be configured to configure a first measurement gap configuration for a first frequency range (FR1) only, wherein the first measurement gap allows the wireless device to measure FR1. The interface circuitry configured to transmit the first measurement gap configuration to the wireless device.

Also disclosed is a method performed by a master node (MN) for measurement gap configuration. The method includes operating in a dual connectivity (DC) configuration with a secondary node (SN) and a wireless device. The method also includes configuring the wireless device with a first measurement gap configuration for measuring a first frequency range (FR1) only.

In some embodiments, the method includes determining that the wireless device uses a separate radio frequency (RF) chain for FR1 and a second frequency range (FR2). The method may also include communicating to the SN that the wireless device uses the separate RF chain for FR1 and FR2. The method may also include communicating to the SN that the SN is to configure the measurement gap configuration for a second frequency range (FR2). In some embodiments, the method includes communicating the measurement gap configuration for FR1 to the SN. The method may also include changing the measurement gap configuration for FR1 to a new configuration and communicating the new configuration to the SN. The method may also include receiving a notification from the SN, the notification informing the MN that the SN modified the measurement gap configuration of the wireless device for FR2. In certain embodiments, the method includes receiving a notification from the SN, the notification informing the MN that the SN modified the measurement configuration of wireless device for FR1.

In some embodiments, the method includes receiving a notification from the SN, the notification informing the MN that the SN added or removed a serving cell that is using a frequency in FR1. In certain embodiments, the serving cell is a NR serving cell. In certain embodiments, the DC configuration is a EN-DC configuration, the MN operates in LTE, and the SN operates in NR.

Also disclosed is a master node (MN) for measurement gap configuration. The MN includes processing circuitry operably coupled to interface circuitry. The processing circuitry configured may be configured to operate in a dual connectivity (DC) configuration with a secondary node (SN) and a wireless device. The processing circuitry configured may be configured to configure a first measurement gap configuration for a first frequency range (FR1) and a second measurement gap configuration for a second frequency range (FR2), wherein the first measurement gap configuration allows the wireless device to measure FR1 and the second measurement gap configuration allows the wireless device to measure FR2. The interface circuitry may be configured to transmit the first measurement gap configuration and the second measurement gap configuration to the wireless device.

Also disclosed is a method performed by a master node (MN) for measurement gap configuration. The method includes operating in a dual connectivity (DC) configuration with a secondary node (SN) and a wireless device. The method includes configuring the wireless device with a first measurement gap configuration for a first frequency range (FR1) and a second measurement gap configuration for a second frequency range (FR2), wherein the first measurement gap configuration allows the wireless device to measure FR1 and the second measurement gap configuration allows the wireless device to measure FR2.

In some embodiments, the method includes determining that the wireless device uses a separate radio frequency (RF) chain for FR1 and FR2. The method may also include communicating to the SN that the SN does not have to configure a measurement gap configuration to the wireless device. The method may further include communicating the first measurement gap configuration for FR1 and the second measurement gap configuration for FR2 to the SN. In some embodiments, the method includes changing the first measurement gap configuration for FR1 and/or the second measurement gap configuration for FR2 to a new configuration and communicating the new configuration to the SN. In certain embodiments, the method includes receiving a message from the SN, the message requesting that the MN modify at least one of the first measurement gap configuration for FR1 and the second measurement gap configuration for FR2 of the wireless device.

In some embodiments, the method includes receiving a notification from the SN, the notification informing the MN that the SN added or removed a serving cell that is using one or more frequencies in FR1 and/or FR2. In some embodiments, the serving cell is a NR serving cell. In certain embodiments, the DC configuration is a NE-DC configuration, the MN operates in NR, and the SN operates in LTE.

Also disclosed is a secondary node (SN) for measurement gap configuration. The SN includes processing circuitry operably coupled to interface circuitry. The processing circuitry may be configured to operate in a dual connectivity (DC) configuration with a master node (MN) and a wireless device. The interface circuitry may be configured to receive a message from the MN, the message associated with a configuration of at least one of a first measurement gap configuration for a first frequency range (FR1) and a second measurement gap configuration for a second frequency range (FR2) for the wireless device.

Also disclosed is a method performed by a secondary node (SN) for measurement gap configuration. The method includes operating in a dual connectivity (DC) configuration with a master node (MN) and a wireless device. The method also includes receiving a message from the MN, the message associated with a configuration of at least one of a first measurement gap configuration for a first frequency range (FR1) and a second measurement gap configuration for a second frequency range (FR2) for the wireless device.

In some embodiments, the message indicates that the SN does not have to setup the measurement gap configuration for either FR1 or FR2 for the wireless device. In some embodiments, the method includes receiving a message from MN, the message indicating the measurement gap configuration for both FR1 and FR2. In certain embodiments, the message indicates that the wireless device uses a separate radio frequency (RF) chain for FR1 and FR2. The method further includes receiving a notification from the MN that the SN is responsible for configuring the measurement gap configuration for FR2. In some embodiments, the method includes receiving the measurement gap configuration for FR1 from the MN.

In certain embodiments, the method includes changing the measurement gap configuration for FR2 for wireless device to a new configuration; and communicating the new configuration to the MN. In some embodiments, the method includes receiving a message from the MN, the message indicating a new configuration of the wireless device, wherein the new configuration comprises at least one of a changed measurement gap configuration for FR1 and a changed measurement gap configuration for FR2. In certain embodiments, the method includes determining a new configuration for at least one of the measurement gap configuration for FR1 and the measurement gap configuration for FR2 and communicating a request to modify the measurement gap configuration of at least one of FR1 and FR2 to the MN. In some embodiments the DC configuration is a EN-DC configuration, the MN operates in LTE, and the SN operates in NR.

Also disclosed is a wireless device for measurement gap configuration. The wireless device includes processing circuitry operably coupled to interface circuitry. The processing circuitry may be configured to operate in a dual connectivity (DC) configuration with a master node (MN) and a secondary node (SN). The processing circuitry may also operate using a radio frequency (RF) chain for a first frequency range (FR1) and a second frequency range (FR2). The interface circuitry may be configured to transmit capability information to the MN, the capability information indicating whether the wireless device supports a separate RF chain for FR1 and FR2 or whether the wireless device supports a shared RF chain for FR1 and FR2.

Also disclosed is a method performed by a wireless device for measurement gap configuration. The method includes operating in dual connectivity (DC) configuration with a master node (MN) and a secondary node (SN). The method includes operating using a radio frequency (RF) chain for a first frequency range (FR1) and a second frequency range (FR2). The method also includes transmitting capability information to the MN, the capability information indicating whether the wireless device supports separate RF chain for FR1 and FR2 or whether the wireless device supports using a shared RF chain for FR1 and FR2.

In some embodiments, the RF chain is a shared RF chain for FR1 and FR2 and the method includes receiving a measurement gap configuration from the MN, the measurement gap configuration for both FR1 and FR2.

In some embodiments, the RF chain is a separate RF chain for FR1 and FR2. The method may further include receiving a first measurement gap configuration for FR1 from the MN and a second measurement gap configuration for FR2 from the SN.

In some embodiments, the RF chain is a separate RF chain for FR1 and FR2. In some embodiments, the method includes receiving a first measurement gap configuration for FR1 and a second measurement gap configuration for FR2 from the MN.

Certain embodiments of the present disclosure may provide one or more technical advantages. For example, in certain embodiments, may enable a UE operating in DC (e.g., EN-DC) to efficiently manage multiple measurement gap configurations from different nodes/RATs. By managing multiple measurement gap configurations the UE can efficiently perform measurements in multiple frequency that belong to frequency ranges within a single RAT and frequency ranges that can span multiple RATs. This may enhance resource allocation because, on average, the network may configure the measurement gaps less frequently thereby reducing network congestion. Embodiments of the present disclosure may also reduce UE power consumption by limiting redundant measurements when operating in two or more networks and/or with two or more network nodes. Other advantages may be readily available to one having skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, there currently exist certain challenges associated with measurement gap configuration. For example, depending on its implementation/capability, a UE will be configured for measuring in the FR1 and FR2 frequency ranges. Before EN-DC is setup, as there may only be LTE RRC running, the measurement configuration will be performed according to the configuration from LTE RRC.

If the UE was supporting separate RF chain, potentially no measurement gap is needed for measuring on FR2 frequencies because LTE doesn't use the FR2 frequencies (however, a measurement gap may be required for inter-frequency measurement with FR1). However, if UE doesn't support separate chains, measuring on FR2 will require a measurement gap—LTE transmission/reception will be interrupted on measuring FR2.

After EN-DC is setup, both LTE RRC and NR RRC are running, and if separate gaps on FR1 and FR2 are needed—i.e., separate RF chains—gap configuration on FR1 could be performed by LTE, NR or both (because both NR and LTE could have serving cells and also configure measurements on FR1). For the case of FR2, even though FR2 may not be used by LTE, LTE may configure measurements on FR2, for example, measurements to be used for MN triggered SN change. As such, the gap configuration on FR2 could be performed by LTE or NR. However, the UE cannot have more than one measurement gap configuration on FR1 or FR2, and thus, some co-ordination is required between the MN and SN to make sure the UE receives a proper measurement gap configuration.

The present disclosure contemplates various embodiments that may address these, and other technical issues associated with existing approaches. In some embodiments, a wireless device may operate using a shared RF chain. In certain embodiments, the MN may configure the wireless device with a measurement gap configuration that allows the wireless device to measure a first frequency range (FR1) and a second frequency range (FR2). In some embodiments, the wireless device may operate using separate RF chains. In certain embodiments, the MN may only configure the wireless device with a measurement gap configuration that allows the wireless device to measure FR1. The SN may then configure the wireless device with a second measurement gap configuration that allows the wireless device to measure FR2. Additionally or alternatively, the MN may configure the wireless device with a measurement gap configuration that allows the wireless device to measure both FR1 and FR2. Embodiments are described in greater detail with reference to FIGS. 4-16, like numerals being used for like and corresponding parts of the various drawings.

Figure 4:
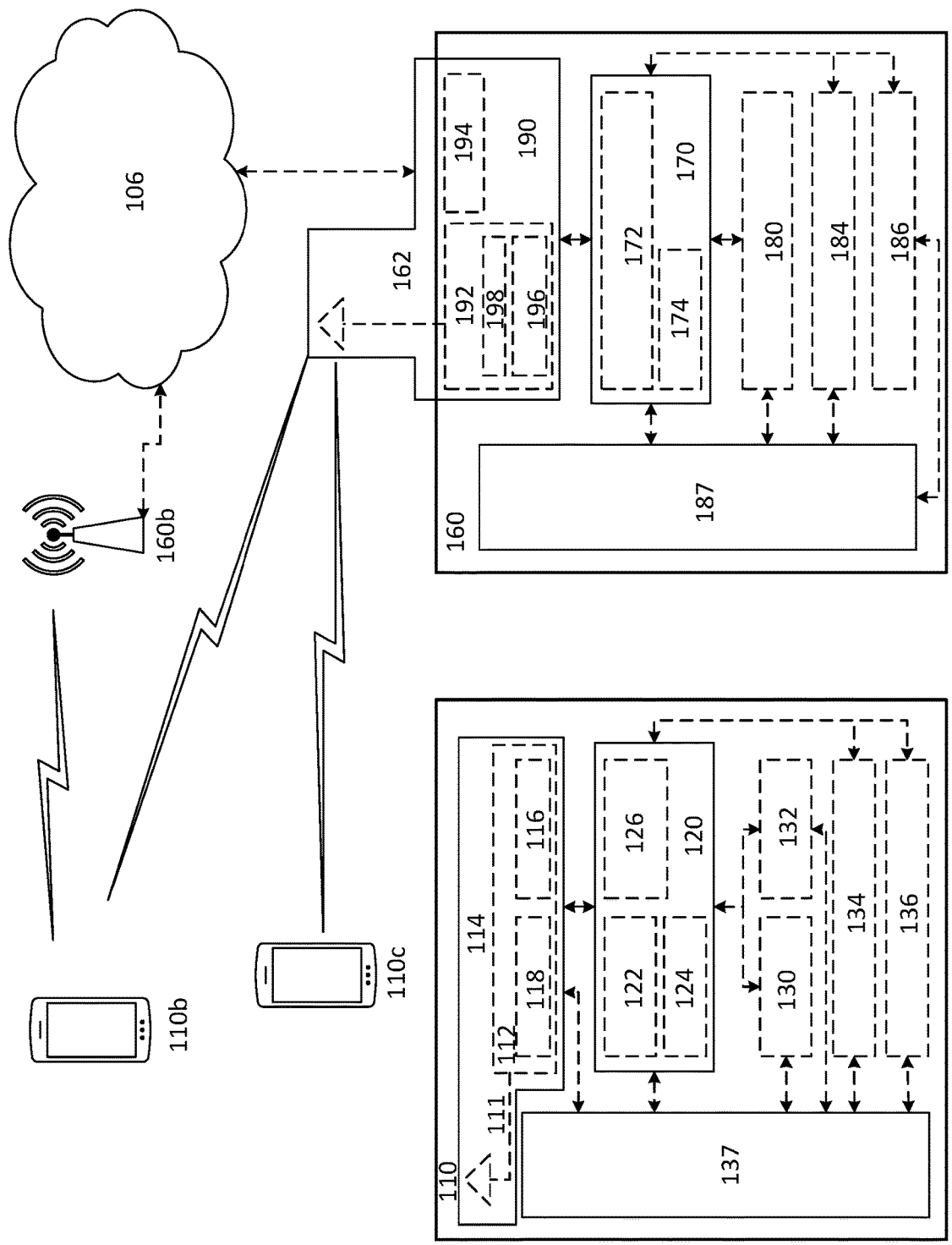
FIG. 4 illustrates an example wireless network, according to certain embodiments.

FIG. 4 illustrates an example wireless network, according to certain embodiments. The wireless network may interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 1:
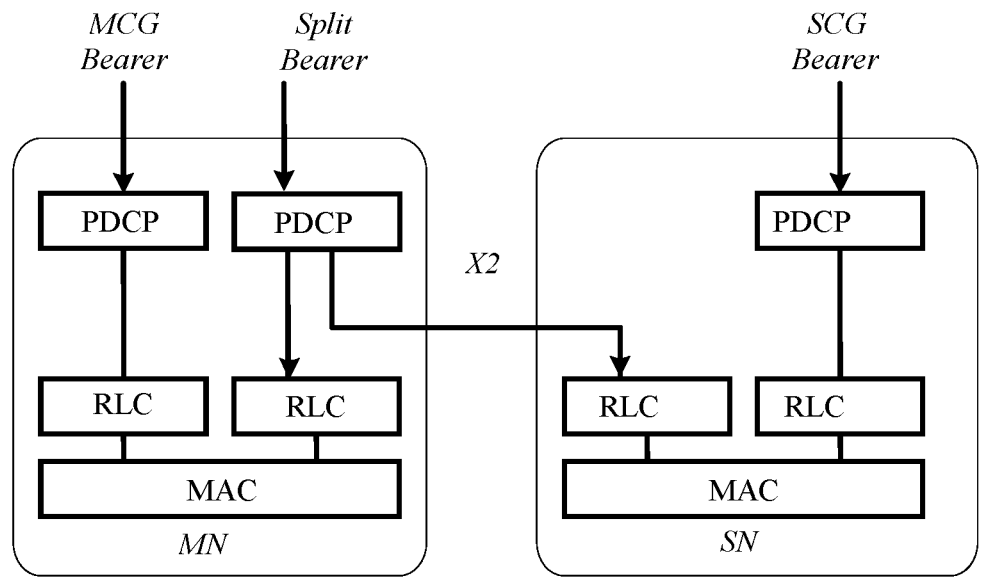
FIG. 1 illustrates and example LTE DC user plane, according to certain embodiments.

In FIG. 4, network node 160 includes processing circuitry 170, device readable medium 180, interface circuitry 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface circuitry 190. In some embodiments, processing circuitry 170 and device readable medium 180 may be considered to be integrated.

Interface circuitry 190 is used in the wired or wireless communication of signaling and/or data between network node 160, network 106, and/or WDs 110. As illustrated, interface circuitry 190 comprises port(s)/terminal(s) 194 to send and receive data, for example to and from network 106 over a wired connection. Interface circuitry 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface circuitry may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface circuitry 190. In still other embodiments, interface circuitry 190 may include one or more ports or terminals 194, radio front end circuitry 192, and RF transceiver circuitry 172, as part of a radio unit (not shown), and interface circuitry 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface circuitry 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface circuitry 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface circuitry 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface circuitry 114. In certain alternative embodiments, antenna 111 may be separate from WD 110 and be connectable to WD 110 through an interface or port. Antenna 111, interface circuitry 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface circuitry 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface circuitry 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface circuitry may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface circuitry 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and WDs 110, 110b, and 110c, with the understanding that there may be any suitable number of network nodes 160a-n and any suitable number of WDs 110a-n. In practice, a wireless network may further include any additional elements suitable to support communication between wireless devices or between a wireless device and another communication device, such as a landline telephone, a service provider, or any other network node or end device. As used herein, Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 2:
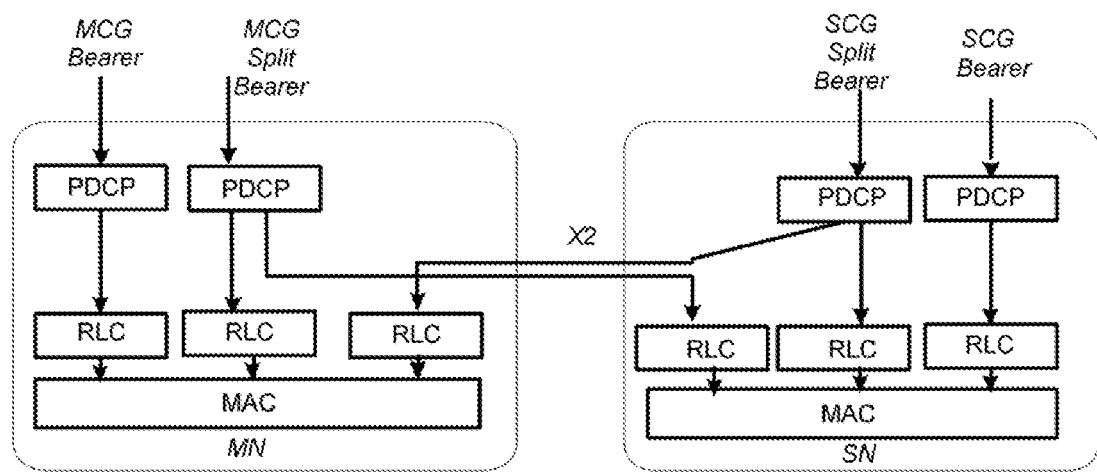
FIG. 2 illustrates an example LTE-NR tight interworking in the user plane, according to certain embodiments.
Figure 5:
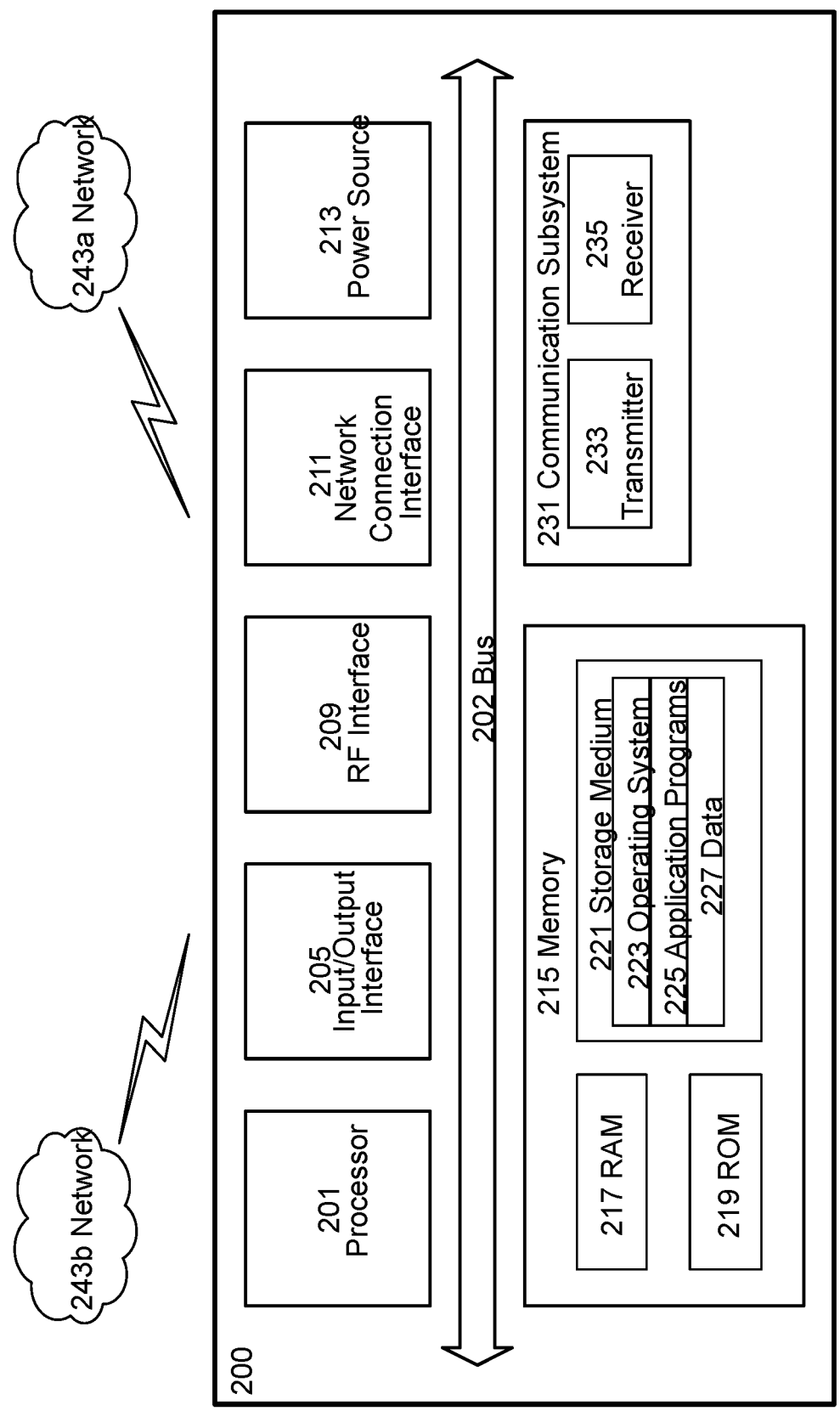
FIG. 5 illustrates an example user equipment, according to certain embodiments.

FIG. 5 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Measurement Gap Configuration

Embodiments of the present disclosure describe systems and methods for measurement gap configuration in dual connectivity scenarios. In certain embodiments, the dual connectivity configuration may be an EN-DC configuration wherein the LTE node (e.g., eNB) is a master node (e.g., MeNB) and the NR node (e.g., gNB) is a secondary node (e.g., a SgNB). However, embodiments of the present disclosure may also apply to other DC configurations (e.g., NE-DC, NR-DC, MR-DC). For example, in certain embodiments, the NR node may act as the master node (e.g., MgNB) while the LTE node acts as the secondary (e.g., SeNB). Moreover, in certain embodiments, the master node and secondary node may utilize radio access technologies other than NR and/or LTE.

According to certain embodiments, the configuration of measurement gaps—both FR1 and FR2—may be handled by LTE when in EN-DC. In these embodiments, if NR needs measurement gaps, after setting up EN-DC, NR may signal LTE. Any changes to the measurement gap may be applied via LTE. The UE 110 may maintain a single measurement gap configuration. In some embodiments, it may be possible to simplify procedures (e.g., no need to solve race conditions).

In some embodiments, the configuration of measurement gaps—both FR1 and FR2—may be handled by NR. For example, LTE may only be capable of configuring the FR1 gaps, while NR may handle one or both of the FR1 and FR2 gaps. In some embodiments, the UE 110 also maintains a single measurement gap configuration. According to certain embodiments, NR can configure only the FR2 measurement gaps when in EN-DC (NR PSCell), and LTE is only capable of configuring FR1 gaps. Thus, in certain embodiments there is a level of independency between the configuration of measurement gaps between NR and LTE. For instance, if NR needs to configure FR1, it may need to do the configuration through LTE.

In certain embodiments, when MN 160A and SN 160B are operating in dual connectivity the may utilize one or more inter-node messages to coordinate measurement gap configuration. For instance, MN 160A and SN 160B may use CG-Config and/or CG-ConfigInfo messages for measurement gap coordination. These messages may have any suitable number of information elements. To illustrate, in some embodiments SN 160B may send a message to MN 160A indicating the frequencies that SN 160B is configuring wireless device 110 for the measurement gap configuration. For instance, SN 160B may utilize CG-Config (including, for example, information element MeasConfigSN) to coordinate the measurement gap configuration of wireless device 110 with MN 160A. Similarly, in some embodiments MN 160A may send a message to SN 160B indicating the frequencies that MN 160A is configuring wireless device 110 for the measurement gap configuration. More particularly, MN 160A may include the measurement gap configuration for wireless device 110 and/or an indication if the measurement gap configuration is for all frequencies or only for FR1 frequencies. For instance, MN 160A may utilize CG-ConfigInfo (including, for example, information element MeasConfigMN) to coordinate the measurement gap configuration of wireless device 110 with SN 160B.

In certain embodiments, when a measurement gap configuration for a given frequency range can only be processed by the UE when provided by one RAT, e.g., LTE RRC and, if measGapConfig is set to setup and, if a measurement gap configuration is already "setup," the UE 110 may release the measurement gap configuration. In certain embodiments, an RRC connected UE 110 may manage measurement gap configurations that can either be configured by one or multiple nodes 160 that can be from one or multiple RATs.

In certain embodiments, the different RATs may comprise LTE and NR. According to certain embodiments, different UE 110 actions may depend on the gap configuration. The following describes non-limiting examples of such scenarios.

Before EN-DC is Setup

In certain embodiments, the UE 110 may be connected to LTE and may need to perform measurements on both NR carrier frequencies and LTE carrier frequencies (for instance, UE 110 has been configured with a list of measurement object that may contain both measObjectEUTRA and measObjectNR). In one embodiment, the UE 110 receives, and processes measurement gap configurations provided by LTE RRC and, the reception of a gap configuration with "setup" from LTE leads to the removal of the other configuration and a re-configuration. Upon the new configuration, the UE performs the measurement accordingly. The gap configuration can be associated to FR1 related configuration and/or the gap configuration can be associated to FR2 related configuration.

While the UE is in EN-DC

In certain embodiments, the UE 110 has an LTE PCell and at least one NR SCell. In one embodiment, even in EN-DC, the UE 110 receives, and processes measurement gap configurations provided by LTE RRC and the reception of a gap configuration with "setup" from LTE leads to the removal of the other configuration and a re-configuration. Upon the new configuration, the UE 110 may perform measurement accordingly. The gap configuration can be associated to FR1 related configuration. In some set of embodiments, this FR1 gap configuration is used by the UE 110 to perform configured LTE and NR measurements within that frequency range. The gap configuration can also be associated with FR2 related configuration. In some set of embodiments, this FR2 gap configuration is used by the UE to perform configured NR measurements within that frequency range.

In another embodiment, the UE 110 can process measurement gap configurations provided by LTE RRC and NR RRC. There can be different rules defined in the different embodiments. For example, what exact gap configuration may only be provided by LTE and NR and how the UE 110 processes these configurations. In some embodiments, only FR1 configuration may be provided by LTE and only LTE can configure FR1. And, only FR2 can be configured by NR and only NR can provide configuration for FR2. In that case, the UE 110 can maintain two measurement gap configurations, one for FR1 and another for FR2 measurements. The UE 110 can manage both gap configurations, but only LTE can re-configure FR1 and only NR can re-configure FR2. In certain embodiments, that the fact that a RAT (e.g., LTE) configures FR1 does not mean that the other RAT (e.g., NR) cannot configure measurements on that frequency range. In this embodiment, if NR wants to configure FR1 measurement it would need to coordinate with LTE, which is responsible for configuring gaps for FR1. And, if LTE wants to configure NR measurements on FR2, it needs to coordinate with NR.

As another example, FR2 gap configuration may only be provided by NR. Hence, if LTE wants to configure NR measurement objects in FR2, LTE needs to coordinate with NR so that NR can possibly re-configure the UE with possibly new gap configuration for FR2. In this embodiment, FR1 gap configuration can either be configured by NR or LTE. And, the UE can re-configure the FR1 configuration if it comes from LTE or NR.

To further illustrate aspects of the present disclosure, the following embodiments are discussed.

Example Embodiment: Shared RF Chain

In a first example embodiment, UE 110 may utilize a shared RF chain. For example, a MN 160A, on determining that the UE uses a shared RF chain for FR1 and FR2, may configure the UE 110 with a measurement gap that is appropriate for measuring both FR1 and FR2 with the single (shared) RF chain. In certain embodiments, the MN 160A communicates to the SN 160B upon SN 160B addition that the SN 160B does not have to configure measurement gap configuration for the UE 110. In some embodiments, the MN 160A communicates the UE's 110 measurement gap configuration, and whether it is for FR1, or FR2 or both to the SN 160B upon SN 160B addition.

In some embodiments, whenever the MN 160A changes the measurement gap configuration of the UE 110, it communicates the measurement gap configuration to the SN 160B. In some embodiments, whenever the MN 160A changes the measurement gap configuration of the UE 110, the UE 110 communicates to the SN 160B the new measurement gap configuration.

In some embodiments, UE 110 may only utilize FR1 frequencies or FR2 frequencies. If only FR1 frequencies are to be measured, MN 160A sets the measurement gap configuration pattern appropriate for FR1 frequencies. In certain embodiments, if only FR2 frequencies are to be measured, MN 160A set the measurement gap configuration pattern appropriate for FR2 frequencies. In some embodiments, if both FR1 and FR2 frequencies are to be measured, MN 160A set the measurement gap configuration pattern appropriate for both FR1 and FR2 frequencies.

In some embodiments, the SN 160B refrains from scheduling the UE 110 on the durations whenever the UE's 110 measurement gap becomes active, and UE 110 will not transmit to/receive from SN 160B in that gap. In some embodiments, whenever the SN 160B modifies measurement configuration of the UE 110 (for instance, SN 160B adds or removes the measurements on some frequencies), it informs the MN 160A about it. In some embodiments, when the MN 160A receives the notification from the SN 160B about changes in the SN 160B measurement configuration, it will reconfigure the measurement gap configuration of the UE 110, if required, to accommodate the new measurement needs of the UE; for example, to ensure the measurement gap is sufficient to measure both MN 160A and SN 160B configured measurements.

The foregoing example may utilize any suitable DC configuration. For example, in one embodiment where the UE 110 uses a shared RF chain, the DC configuration may be an EN-DC configuration. The MN 160A may operate in LTE as a MeNB 160A and the SN 160B may operate in NR as a SgNB 160B.

Example Embodiment: Separate RF Chain Configuring FR1

In a second example embodiment, UE 110 may utilize a separate RF chain. For example, the MN 160A, on determining that the UE 110 uses a separate RF chain for FR1 and FR2, may configure the UE with a measurement gap that is appropriate for measuring on FR1 frequencies. For instance, UE 110 may indicate to the network whether UE 110 supports separate or a shared RF chain for FR1 and FR2. In some embodiments, the MN 160A communicates to the SN 160B upon SN 160B addition that the UE has separate RF chain for FR1 and FR2 and whether measurement gap is configured for FR2 by MN 160A. In some embodiments, the MN 160A communicates the UE's measurement gap configuration for FR1 frequencies to the SN 160B upon SN 160B addition.

Changes to the UE's measurement gap may be handled in different ways. In some embodiments, whenever the MN 160A changes the UE's measurement gap configuration for FR1 frequencies, it communicates the measurement gap configuration on FR1 to the SN 160B. In certain embodiments, whenever the MN 160A changes the UE's measurement gap configuration for FR1 frequencies, the UE communicates to the SN 160B the new measurement gap configuration. In some embodiments, the SN 160B configures the UE with a measurement gap that is appropriate for measuring on FR2 frequencies.

Scheduling the UE's measurement gap may be handled in different ways. In certain embodiments, the SN 160B refrains from scheduling the UE on SN 160B serving cells that are using FR1 frequency in durations whenever the measurement gaps for FR1 become active, and UE will not transmit to/receive from serving cell operating on FR1 but can communicate on serving cell operating on FR2. In some embodiments, the SN 160B refrains from scheduling the UE on SN 160B serving cells that are using FR2 frequency in durations whenever the measurement gaps for FR2 become active, and UE will not transmit to/receive from serving cell operating on FR2 but can communicate on serving cell operating on FR1.

In some embodiments, the SN 160B modifies the UE's measurement gap configuration for FR2 frequencies, it informs the MN 160A about it. In some embodiments, whenever the SN 160B modifies the UE's measurement gap configuration for FR2 frequencies, the UE communicates to the MN 160A the new measurement gap configuration on FR2.

In some embodiments, the MN 160A communicates to the SN 160B whenever it changes measurements configurations on FR2 (i.e. adds or removes measurements on FR2 frequencies). In certain embodiments, when the SN 160B receives the notification from the MN 160A about changes in the MN 160A measurement configuration on FR2, it will reconfigure the UE's measurement gap configuration for FR2, if required, to accommodate the new measurement needs of the UE (e.g., make sure the measurement gap on FR2 is good enough to measure both MN 160A and SN 160B configured measurements). In some embodiments, the SN 160B communicates to the MN 160A whenever it changes measurements configurations on FR1; for example, adding or removing measurements on FR1 frequencies. In some embodiments, when the MN 160A receives the notification from the SN 160B about the changes in the SN 160B measurement configuration on FR1, it will reconfigure the UE's measurement gap configuration for FR1, if required, to accommodate the new measurement needs of the UE (e.g., make sure the measurement gap on FR1 is good enough to measure both MN 160A and SN 160B configured measurements). In some embodiments, the SN 160B communicates to the MN 160A whenever it adds or removes an NR serving cell that is using an FR1 frequency. In some embodiments, when the MN 160A receives the notification from the SN 160B about the removal or addition of NR serving cell(s) on FR1 frequency, it will reconfigure the UE's measurement gap configuration for FR1, if required, to accommodate the new measurement as well as performance needs of the UE (e.g., make sure the measurement gap on FR1 is good enough to measure both MN 160A and SN 160B configured measurement, and it will also not harm the performance of the UE on the NR serving cells that use FR1, as the UE can't be scheduled in those cells when the FR1 measurement gaps are active).

The foregoing example may utilize any suitable DC configuration. For example, in one embodiment where the UE 110 uses a shared RF chain, the DC configuration may be an EN-DC configuration. The MN 160A may operate in LTE as a MeNB 160A and the SN 160B may operate in NR as a SgNB 160B.

Example Embodiment: Separate RF Chain Configuring FR1 and FR2

In another embodiment, the MN 160A, on determining that the UE uses a separate RF chain for FR1 and FR2, may configure the UE with two measurement gaps, one that is appropriate for measuring on FR1 and another on FR2. In some embodiments, the MN 160A communicates to the SN 160B upon SN 160B addition that the SN 160B does not have to configure measurement gap configuration for the UE 110.

Changes to the UE's measurement gap configuration may be communicated in several non-limiting ways. In some embodiments, the MN 160A communicates the UE's measurement gap configuration for FR1 and the UE's measurement gap configuration for FR2 to the SN 160B upon SN 160B addition. In some embodiments, whenever the MN 160A changes the UE's measurement gap configuration for FR1 frequencies or the UE's measurement gap configuration for FR2 frequencies, the MN 160A communicates to the SN 160B the concerned measurement gap configuration. In some embodiments, whenever the MN 160A changes the UE's measurement gap configuration for FR1 frequencies or the UE's measurement gap configuration for FR2 frequencies, the UE communicates to the SN 160B the concerned measurement gap configuration.

The MN 160A and/or SN 160B may refrain from scheduling the UE on certain frequencies in certain non-limiting circumstances. In some embodiments, the SN 160B refrains from scheduling the UE on SN 160B serving cells that are using FR1 frequency in durations whenever the measurement gaps for FR1 become active and UE will not transmit to/receive from serving cells operating on FR1 but can communicate with serving cells operating on FR2. In some embodiments, the SN 160B refrains from scheduling the UE on SN 160B serving cells that are using FR2 frequency in durations whenever the measurement gaps for FR2 become active and UE will not transmit to/receive from serving cells operating on FR2 but can communicate with serving cells operating on FR1.

In some embodiments, the SN 160B communicates to the MN 160A whenever it changes measurements configurations on FR1 or FR2 (e.g., adds or removes measurements on FR1 or FR2 frequencies). In some embodiments, when the MN 160A receives the notification from the SN 160B about the changes in the SN 160B measurement configuration on FR1 or FR2, it will reconfigure the UE's measurement gap configuration for FR1 or FR2, respectively, if required, to accommodate the new measurement needs of the UE (e.g., make sure the measurement gap on FR1 is good enough to measure both MN 160A and SN 160B configured measurements). In some embodiments, the SN 160B communicates to the MN 160A whenever it adds or removes an NR serving cell that is using FR1 or FR2 frequency. In some embodiments, when the MN 160A receives the notification from the SN 160B about the removal or addition of NR serving cell(s) on FR1 or FR2 frequency, it will reconfigure the UE's measurement gap configuration for FR1 or FR2, respectively, if required, to accommodate the new measurement as well as performance needs of the UE (e.g., make sure the measurement gap on FR1 is good enough to measure both MN 160A and SN 160B configured measurement, and it will also not harm the performance of the UE on the NR serving cells that use FR1, as the UE can't be scheduled in those cells when the FR1 measurement gaps are active).

Example Embodiment: Contradicting Measurement Gap Configurations

In an example embodiment, when UE has been configured with a measurement gap by MN 160A and it receives contradicting measurement gap configuration from SN 160B, UE discards the configuration from SN 160B and possibly indicates that to SN 160B, MN 160A or both. In some embodiments, when UE has been configured with a measurement gap by SN 160B and it receives contradicting measurement gap configuration from MN 160A, UE discards the configuration from SN 160B and possibly indicates that to SN 160B, MN 160A or both. In some embodiments, the contradicting measurement gap pattern is a measurement gap pattern for the same FR1 or FR2, one single measurement gap pattern to cover both FR1 and FR2.

The foregoing examples for measurement gap configurations are merely illustrative and are not considered to be limiting.

Example Flowcharts and Apparatuses for Measurement Gap Configuration

FIGS. 6-9 illustrate example flowcharts and apparatuses for measurement gap configuration. These figures are merely illustrative and are not limiting.

Figure 6:
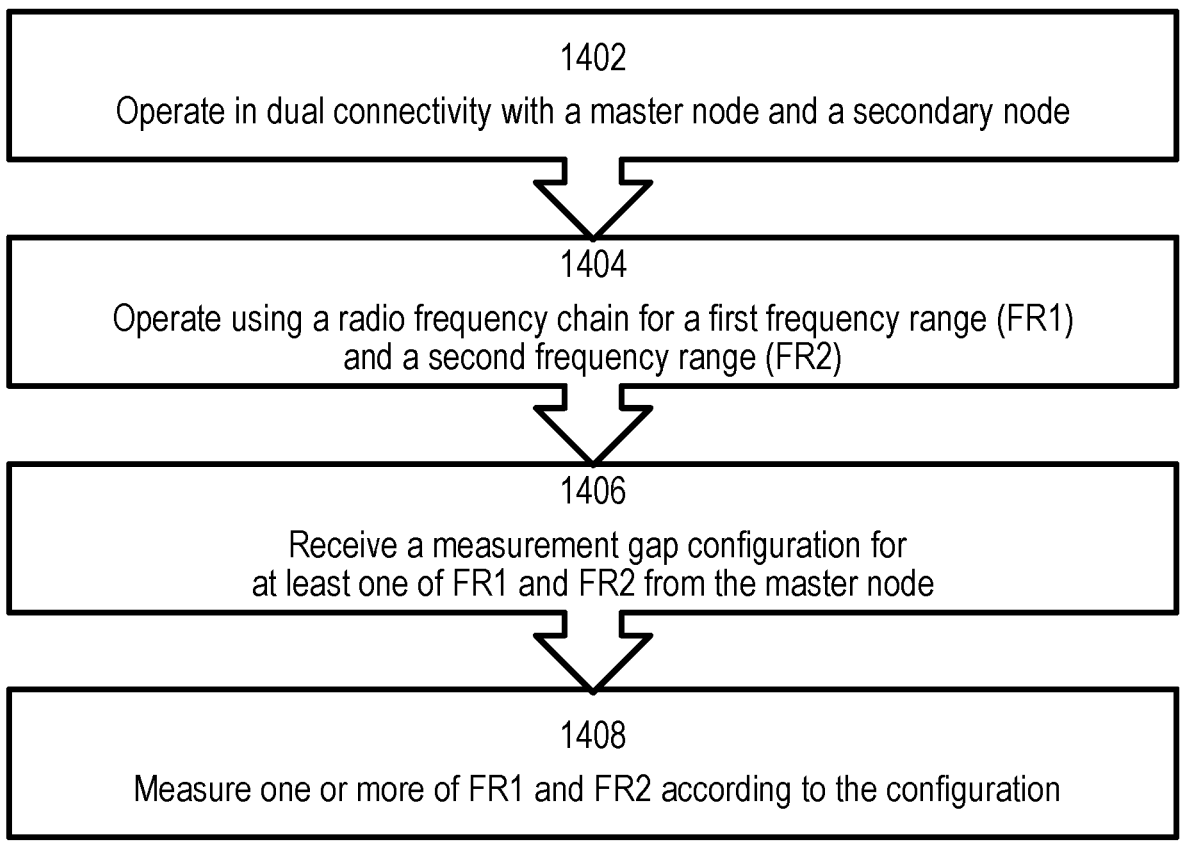
FIG. 6 illustrates a flowchart of an example method in a wireless device for measurement gap configuration, according to certain embodiments.

FIG. 6 illustrates a flowchart of an example method in a wireless device for measurement gap configuration, according to certain embodiments. The method begins at step 1402, with wireless device 110 operating in a dual connectivity configuration with a master node (MN) and a secondary node (SN). In certain embodiments, the dual connectivity configuration may be an EN-DC configuration wherein the master node is a LTE node (e.g., MeNB) and the secondary node is a NR node (e.g., a SgNB). In certain embodiments, the dual connectivity configuration may be a different configuration, such as NE-DC, NR-DC, MR-DC. At step 1402, wireless device 110 may operate using a radio frequency (RF) chain for a first frequency range (FR1) and a second frequency range (FR2). At step 1406, the wireless device 110 may receive a measurement gap configuration from the MN 160A. In certain embodiments, wireless device 110 may receive one or more measurement gap configuration messages from the master node to setup the measurement gap configuration. In certain embodiments, the gap configuration is signaled to wireless device 110 over the RRC protocol as part of the measurement configuration. At step 1408, the wireless device 110 may measure FR1 and FR2 according to the measurement gap configuration. Put another way, the measurement gap configuration may refer to periods that wireless device 110 may use to perform measurements such that no uplink or downlink transmissions are schedule.

Figure 7A:
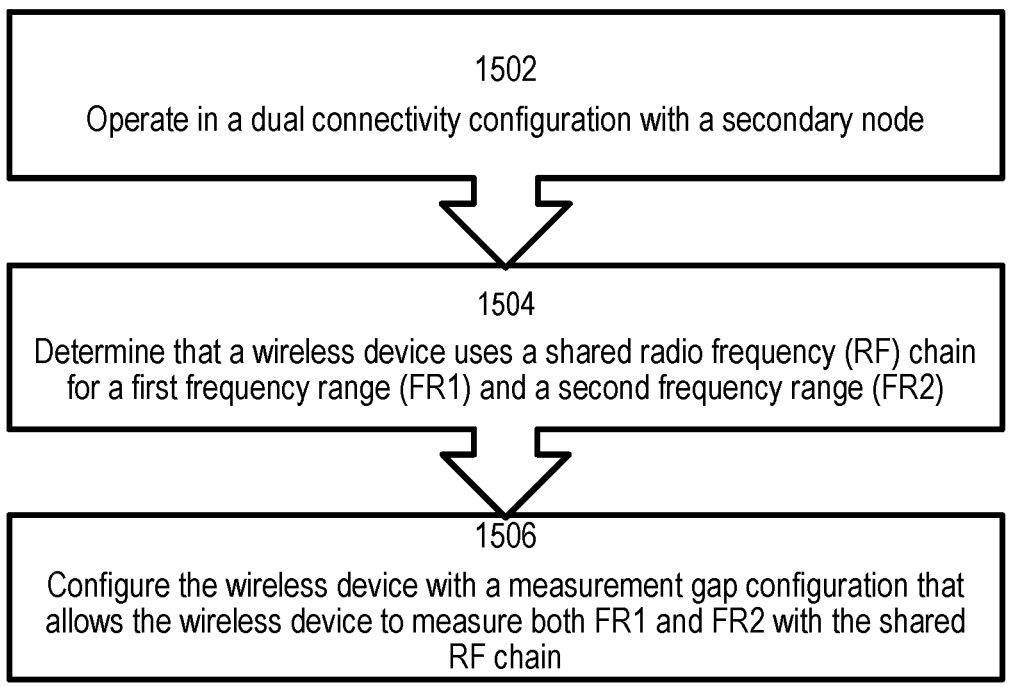
FIGS. 7A-D illustrate flowcharts of example methods in a master node and secondary node for measurement gap configuration, according to certain embodiments.

FIG. 7A illustrates a flowchart of an example method in a master node 160A for measurement gap configuration, according to certain embodiments. The method begins at step 1502, wherein master node 160A operates in a dual connectivity mode with a secondary node 160B. As explained above in FIG. 6, the dual connectivity configuration may be any suitable configuration, such as EN-DC, NE-DC, NR-DC, MR-DC. At step 1504, the master node 160A may determine that a wireless device 110 uses a shared radio frequency (RF) chain for a first frequency range (FR1) and a second frequency range (FR2). For example, wireless device 110 may indicate to the network that it uses a shared RF chain as part of the UE capability information exchange. master node 160A may determine that wireless device 110 uses a shared RF chain when it receives. At step 1506, the master node 160 may configure the wireless device 110 with a measurement gap, wherein the measurement gap allows the wireless device to measure both FR1 and FR2 with the shared RF chain. For example, in certain embodiments the master node 160A sets up the measurement gap configuration using the RRC protocol.

Figure 7B:
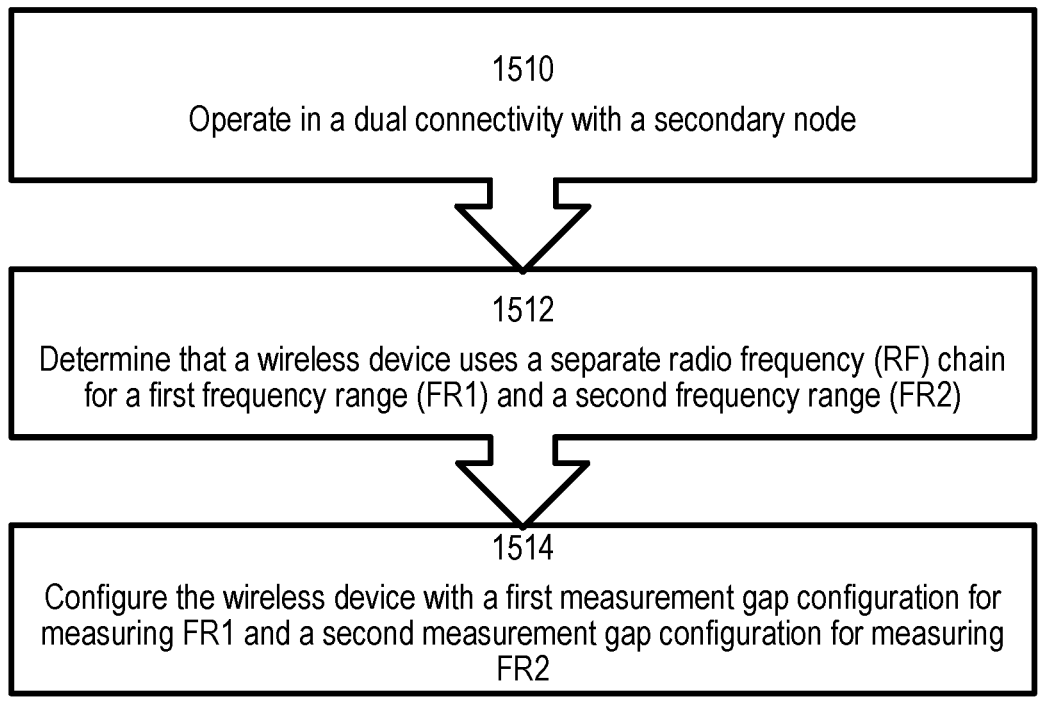

FIG. 7B illustrates a flowchart of an example method in a master node 160 for measurement gap configuration, according to certain embodiments. The method begins at step 1510, wherein the master node 160 operates in a dual connectivity with a secondary node. At step 1512, master node 160 may determine that a wireless device uses a separate radio frequency (RF) chain for a first frequency range (FR1) and a second frequency range (FR2). At step 1514, the master node 160 may configure the wireless device 110 with a first measurement gap for measuring FR1 and a second measurement gap for measuring FR2. For example, in certain embodiments master node 160 may communicate one or more messages to wireless device indicating the first measurement gap and the second measurement gap.

Figure 7C:
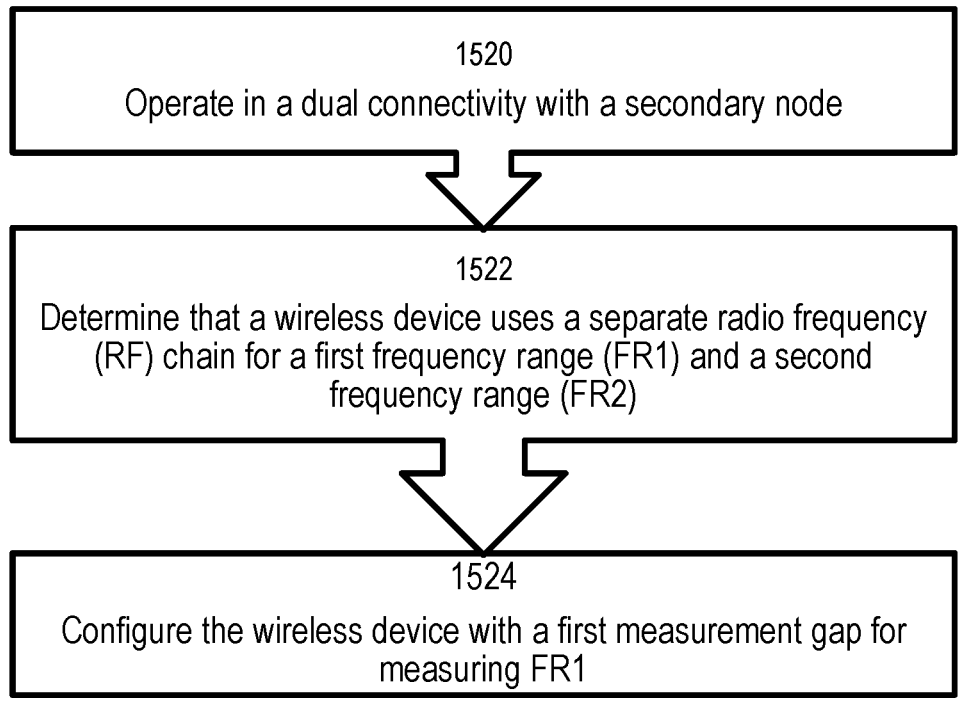

FIG. 7C illustrates a flowchart of an example method in a master node 160A for measurement gap configuration, according to certain embodiments. The method begins at step 1520, wherein the master node 160A operates in a dual connectivity with a secondary node 160B. At step 1522, master node 160A may determine that a wireless device 110 uses a separate radio frequency (RF) chain for a first frequency range (FR1) and a second frequency range (FR2). At step 1524, the master node 160A may configure the wireless device 110 with a first measurement gap for measuring FR1 only. For example, in certain embodiments master node 160 may communicate one or more messages to wireless device indicating the first measurement gap configuration. In certain embodiments, secondary node 160B may be responsible for configuring a second measurement gap configuration for FR2. In this manner, master node 160A may configure the first measurement gap configuration and secondary node 160B may configure at least the second measurement gap configuration.

Figure 7D:
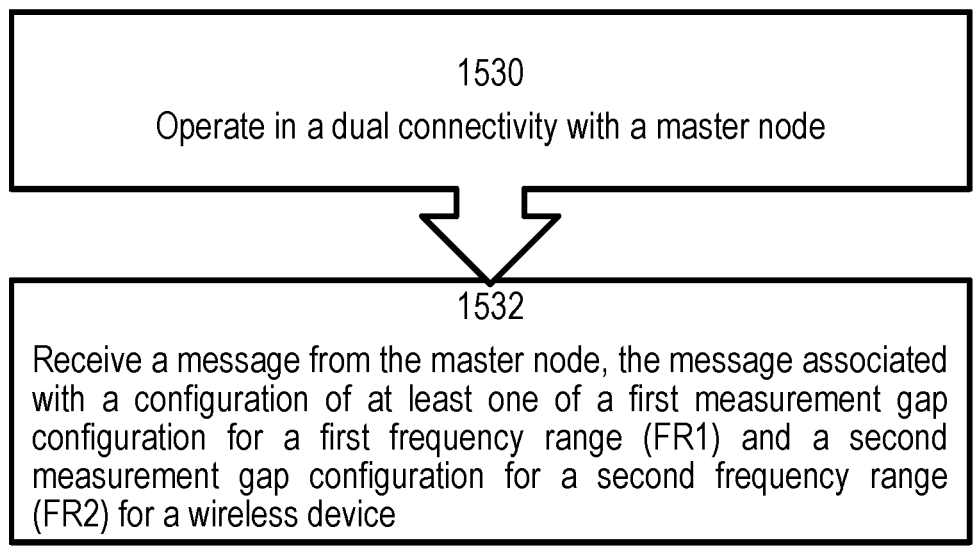

FIG. 7D illustrates a flowchart of an example method in a secondary node 160B for measurement gap configuration, according to certain embodiments. The method begins at step 1530, wherein the secondary node 160B operates in a dual connectivity with a master node 160A. At step 1532, secondary node 160B may receive a message from the master node 160A. The message may be associated with a configuration of the UE 110. In some embodiments, the message may be associated with a configuration of at least one of a first measurement gap configuration for a first frequency range (FR1) and a second measurement gap configuration for a second frequency range (FR2) for the UE 110. For example, in some embodiments, the message indicates to the SN 160B that it does not have to setup the measurement gap configuration for either FR1 or FR2 for the UE 110. In some embodiments, SN 160B may further receive a message from MN 160A. The message may indicate the measurement gap configuration for both FR1 and FR2.

As another example, the message received by SN 160B may indicate that the UE 110 uses a separate radio frequency (RF) chain for FR1 and FR2. The SN 160B may then receive a notification from the MN 160A that the SN 160B is responsible for configuring the measurement gap configuration for FR2. In certain embodiments, the SN 160B may then receive the measurement gap configuration for FR1 from the MN 160A. SN 160B may change the measurement gap configuration for FR2 for UE 110 to a new configuration. The SN 160B may then communicate the new configuration to the MN 160A.

Figure 8:
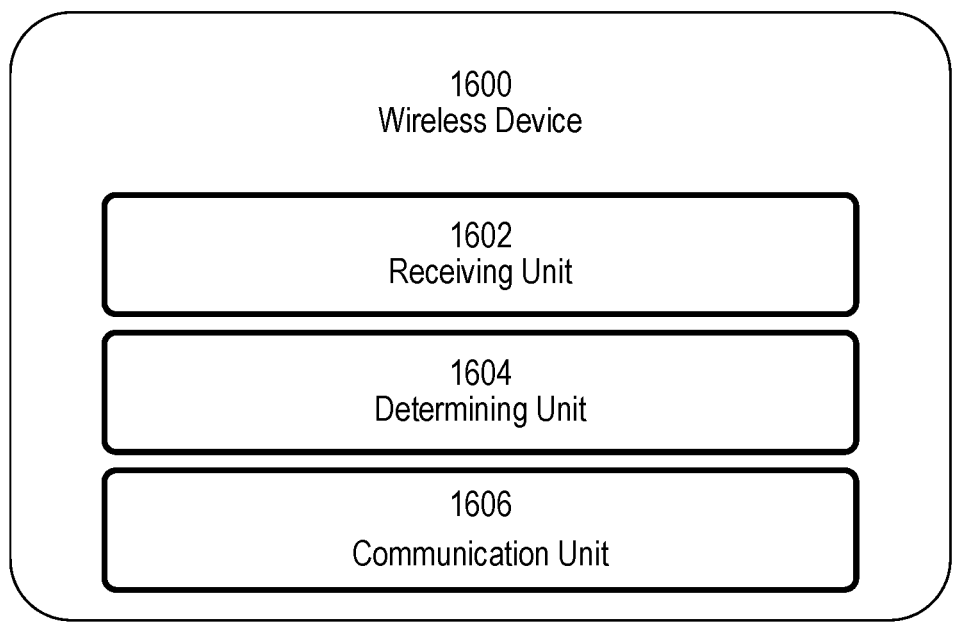
FIG. 8 illustrates an example wireless device, according to certain embodiments.

FIG. 8 illustrates an example wireless apparatus 1600, according to certain embodiments. The apparatus may be implemented in a wireless device (e.g., wireless device 110 shown in FIG. 1). Apparatus 1600 is operable to carry out the example method described with reference to FIG. 6 and possibly any other processes or methods disclosed herein. It is also to be understood that the method of FIG. 6 is not necessarily carried out solely by apparatus 1600. At least some operations of the method can be performed by one or more other entities, including virtual apparatuses.

Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1602, determining unit 1604, storage unit 1606, and communication unit 1608 and any other suitable units of apparatus 1600 to perform corresponding functions according one or more embodiments of the present disclosure.

As illustrated in FIG. 8, apparatus 1600 includes receiving unit 1602, determining unit 1604, and communication unit 1606. In certain embodiments, apparatus 1600 may operate in a dual connectivity (DC) configuration with a master node 160A and a secondary node 160B. Apparatus 1600 may perform a measurement gap configuration, which in some embodiments may allow apparatus 1600 to define periods of no uplink or downlink transmissions so that apparatus 1600 may perform measurements (e.g., measurements of the frequency range). Determining unit 1604 may operate using a radio frequency (RF) chain for a first frequency range (FR1) and a second frequency range (FR2). Receiving unit 1602 may be operable to receive a measurement gap configuration from one or more nodes, such as master node 160A and/or secondary node 160B. Determining unit 1604 may further be operable to measure FR1 and FR2 according to the measurement gap configuration.

Figure 3:
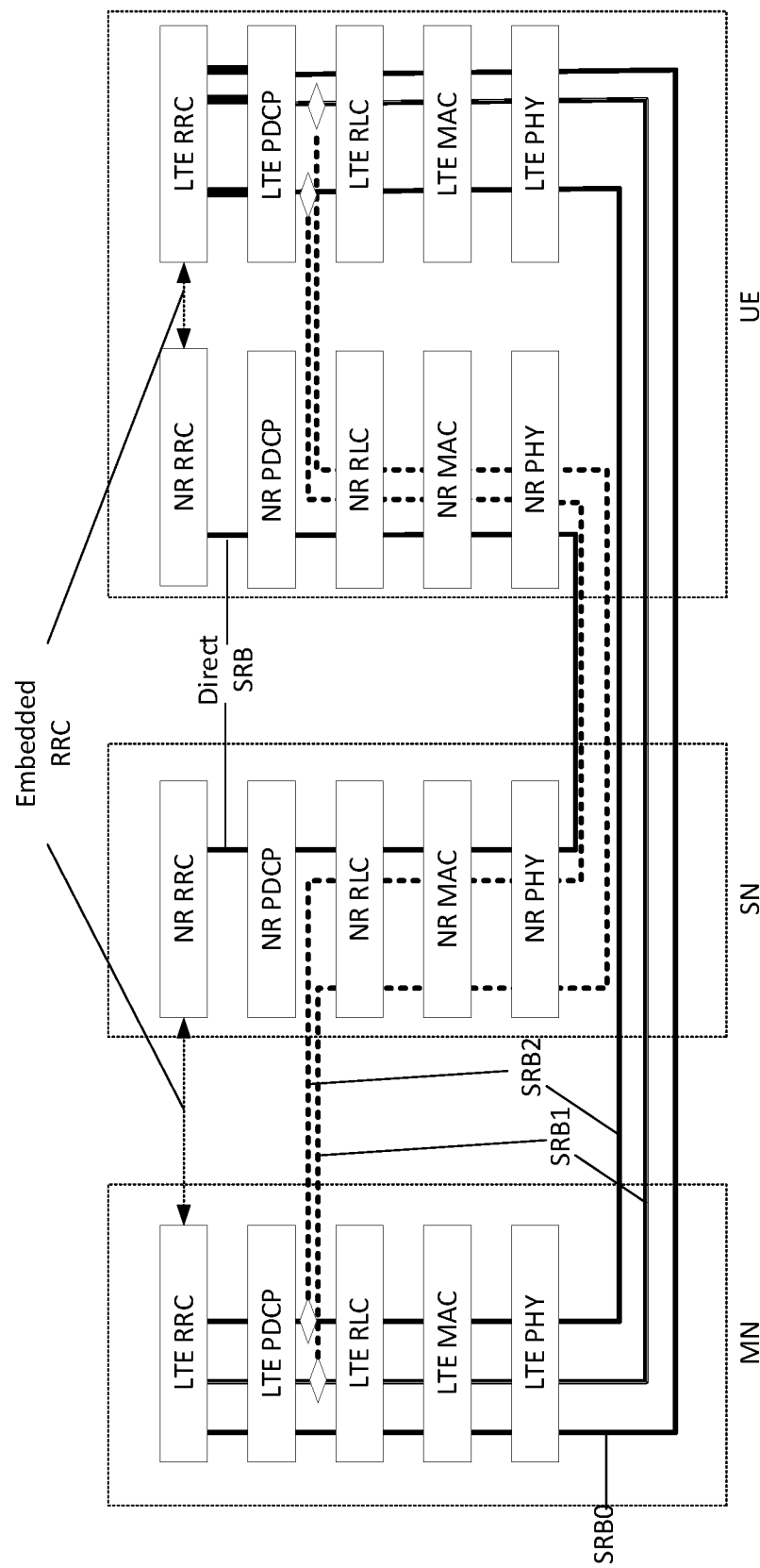
FIG. 3 illustrates an example LTE-NR tight interworking in the control plane, according to certain embodiments.
Figure 9:
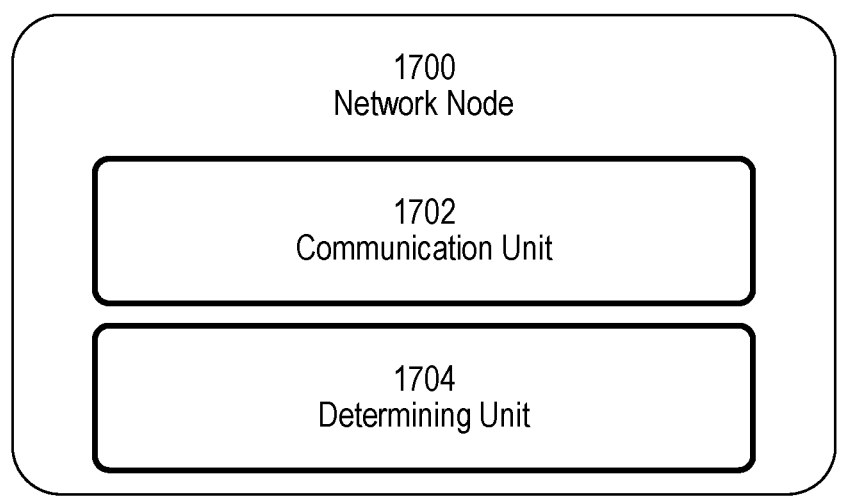
FIG. 9 illustrates an example network node, according to certain embodiments.

FIG. 9 illustrates an example network node apparatus 1700, according to certain embodiments. The apparatus 1700 may be implemented in a network node (e.g., network node 160 shown in FIG. 3). Apparatus 1600 is operable to carry out the example method described with reference to FIGS. 7A and/or 7B and possibly any other processes or methods disclosed herein. It is also to be understood that the method of FIGS. 7A and/or 7B is not necessarily carried out solely by apparatus 1700. At least some operations of the method can be performed by one or more other entities, including virtual apparatuses.

Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702 and determining unit 1704 and any other suitable units of apparatus 1700 to perform corresponding functions according one or more embodiments of the present disclosure.

As illustrated in FIG. 9, apparatus 1700 includes communication unit 1702 and determining unit 1704. In certain embodiments, determining unit 1704 may determine that a wireless device 110 uses a shared radio frequency (RF) chain for a first frequency range (FR1) and a second frequency range (FR2). Determining unit 1704 and/or communication unit 1702 may then configure the wireless device 110 with a measurement gap, wherein the measurement gap allows the wireless device to measure both FR1 and FR2 with the shared RF chain. In some embodiments, determining unit 1704 may determine that wireless device 110 uses a separate radio frequency (RF) chain for a first frequency range (FR1) and a second frequency range (FR2). Determining unit 1704 and/or communication unit 1702 may then configure the wireless device 110 with a first measurement gap for measuring FR1 and a second measurement gap for measuring FR2.

Virtualization Environments

Figure 10:
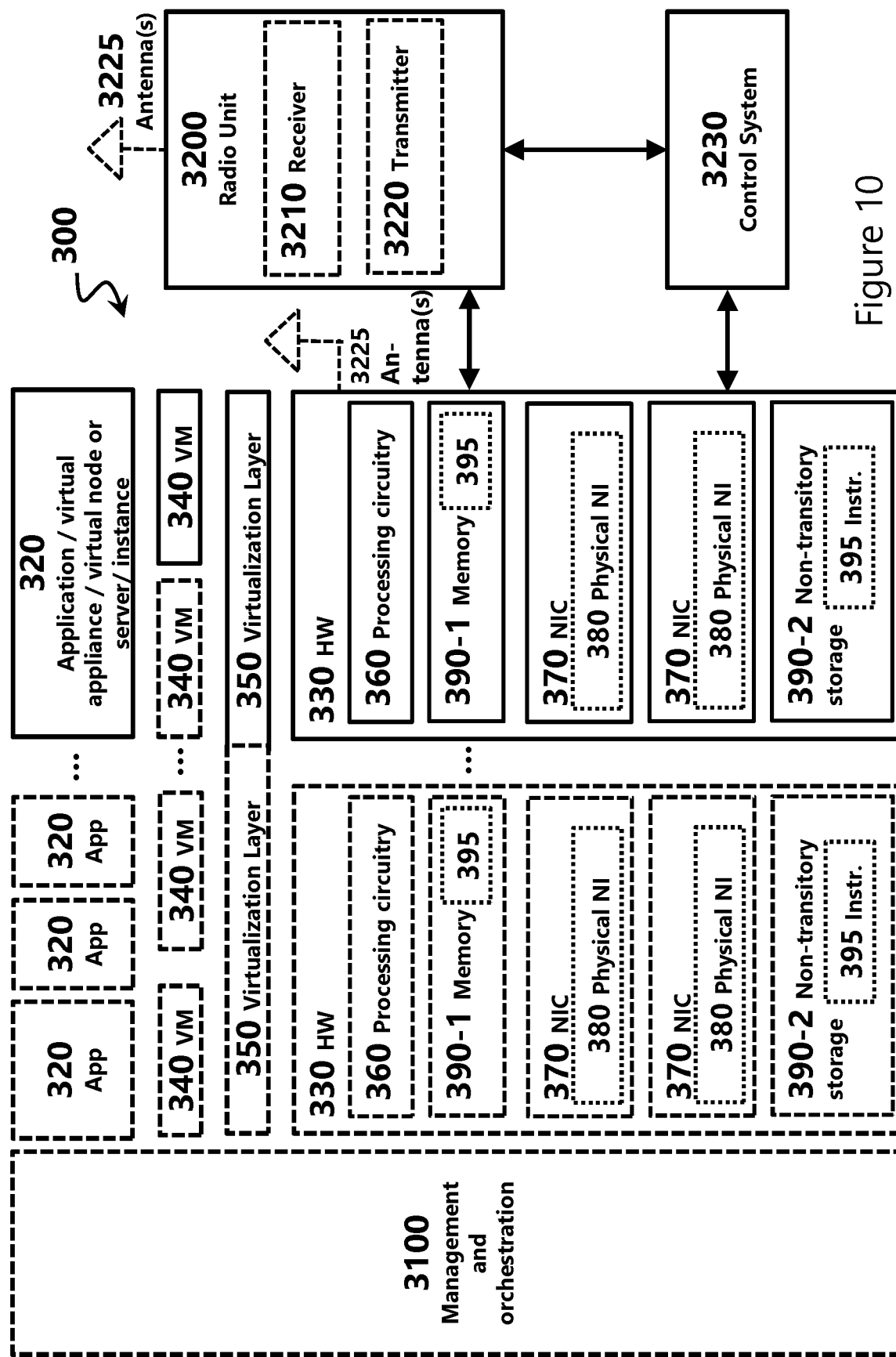
FIG. 10 illustrates an example virtualization environment, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Telecommunication Network Example Embodiments

Figure 11:
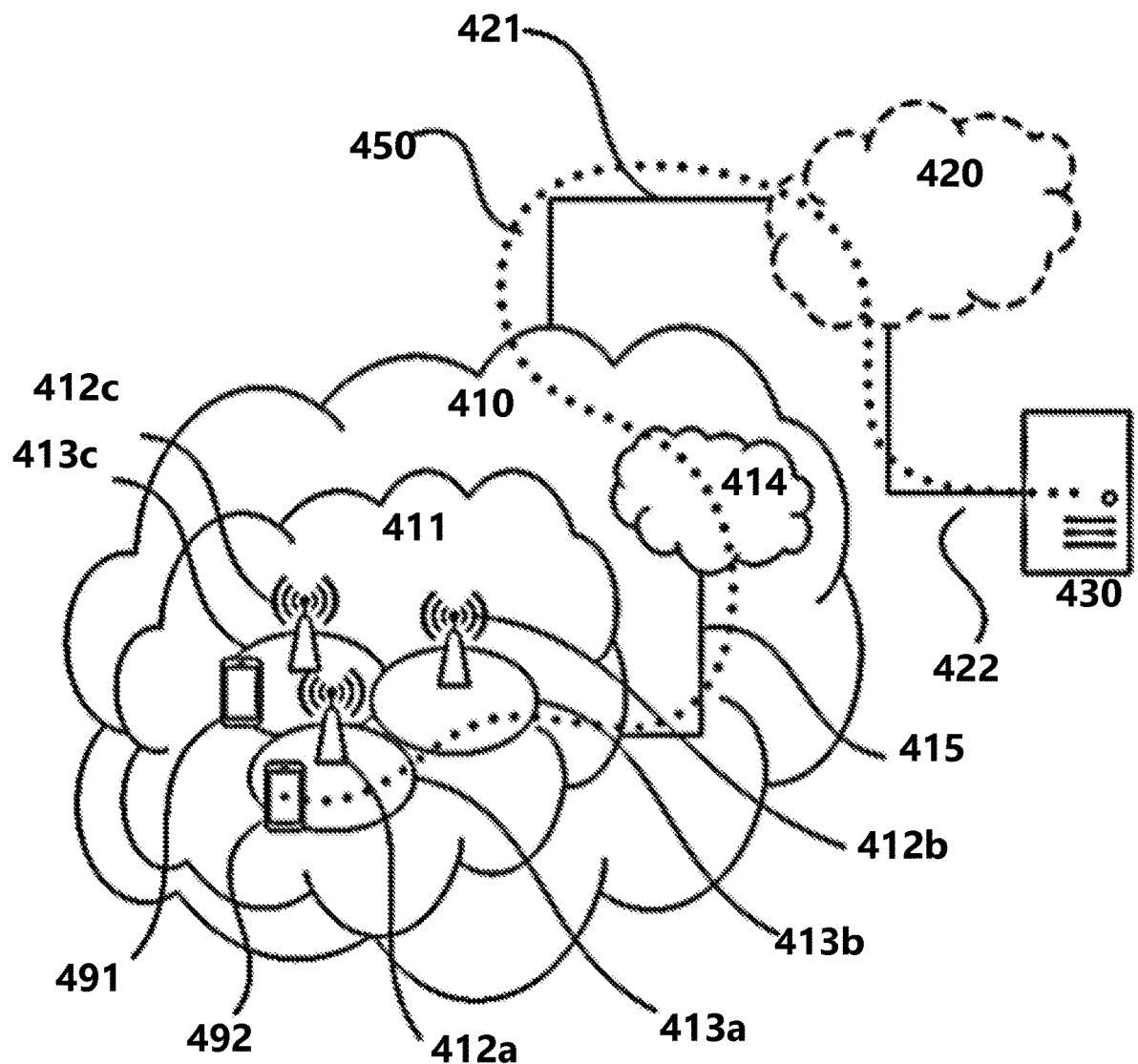
FIG. 11 illustrates an example telecommunication network connected via an intermediate network to a host computer, according to certain embodiments.

With reference to FIG. 11, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Host Computer Example Embodiments

Figure 12:
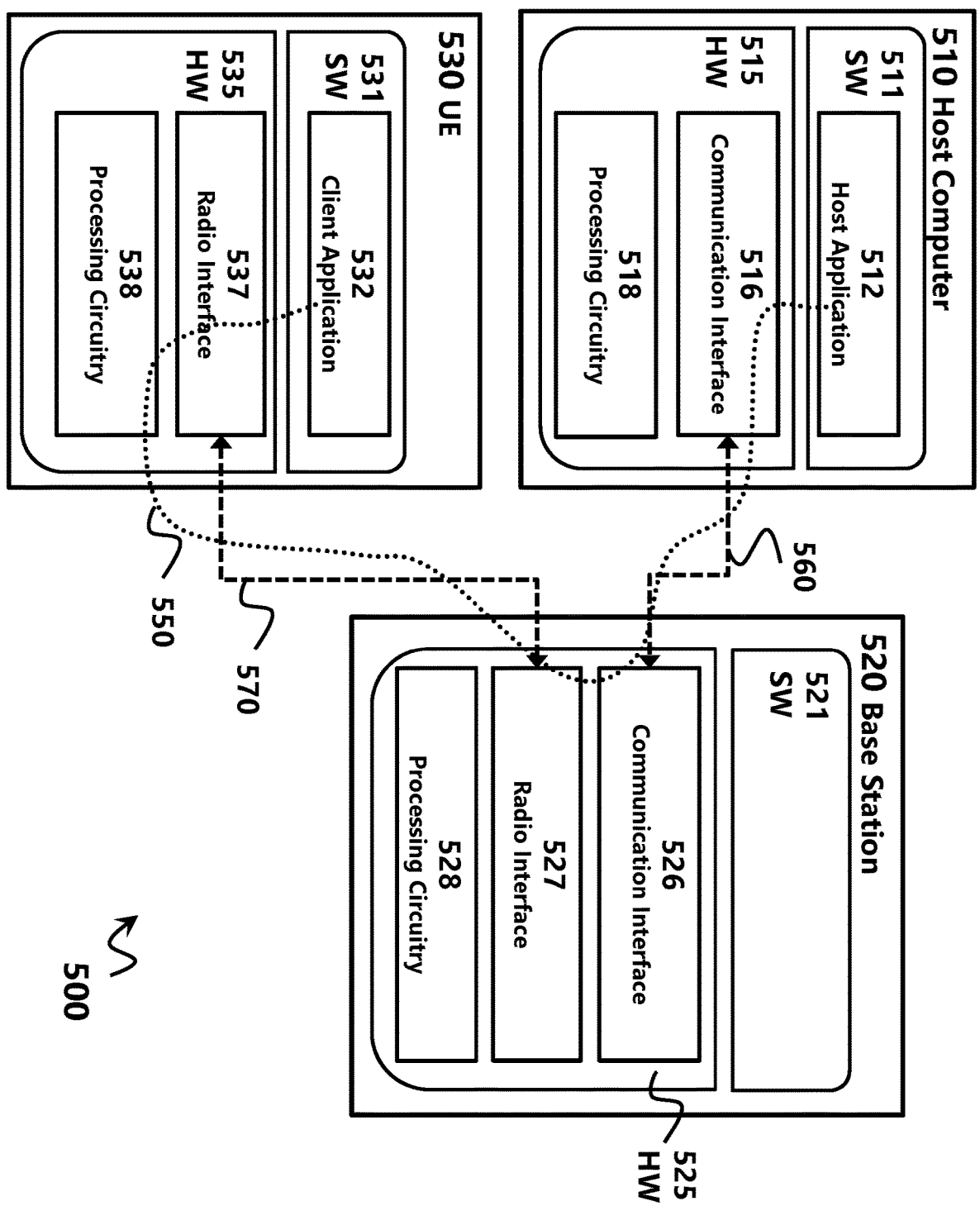
FIG. 12 illustrates an example host computer communicating via a base station with a user equipment over a partially wireless connection, according to certain embodiments.

FIG. 12 illustrates an example host computer communicating via a base station with a user equipment over a partially wireless connection, according to certain embodiments. Example implementations, in accordance with an embodiment, of the UE, base station and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 12 may be similar or identical to host computer 430, one of base stations 412a, 412b, 412c and one of UEs 491, 492 of FIG. 11, respectively. This is to say, the inner workings of these entities may be as shown in FIG. 5 and independently, the surrounding network topology may be that of FIG. 11.

In FIG. 12, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 13:
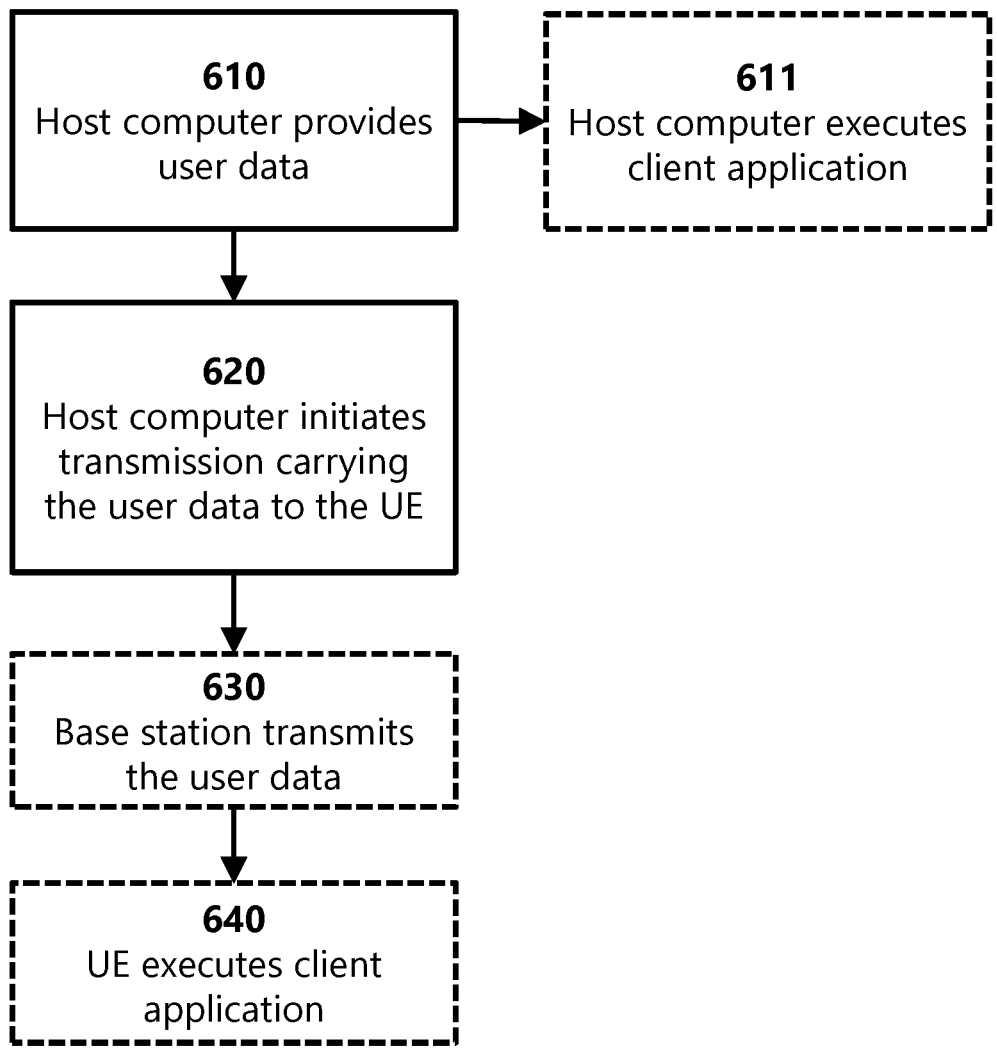
FIG. 13 is a flowchart illustrating a method implemented, according to certain embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 14:
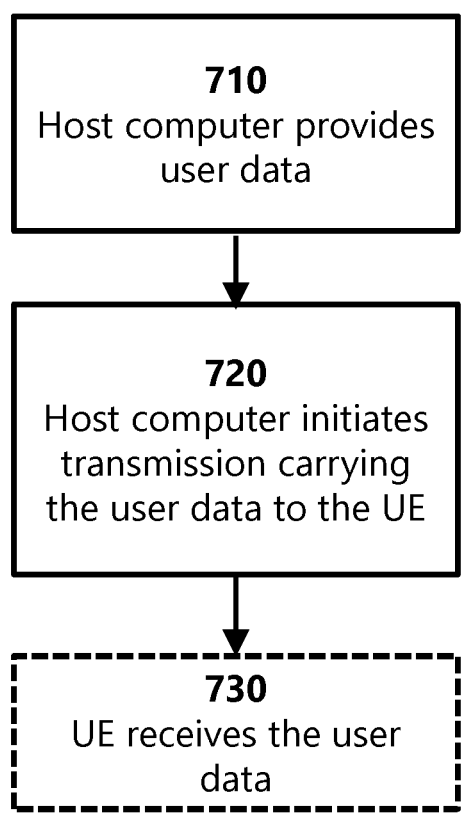
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 15:
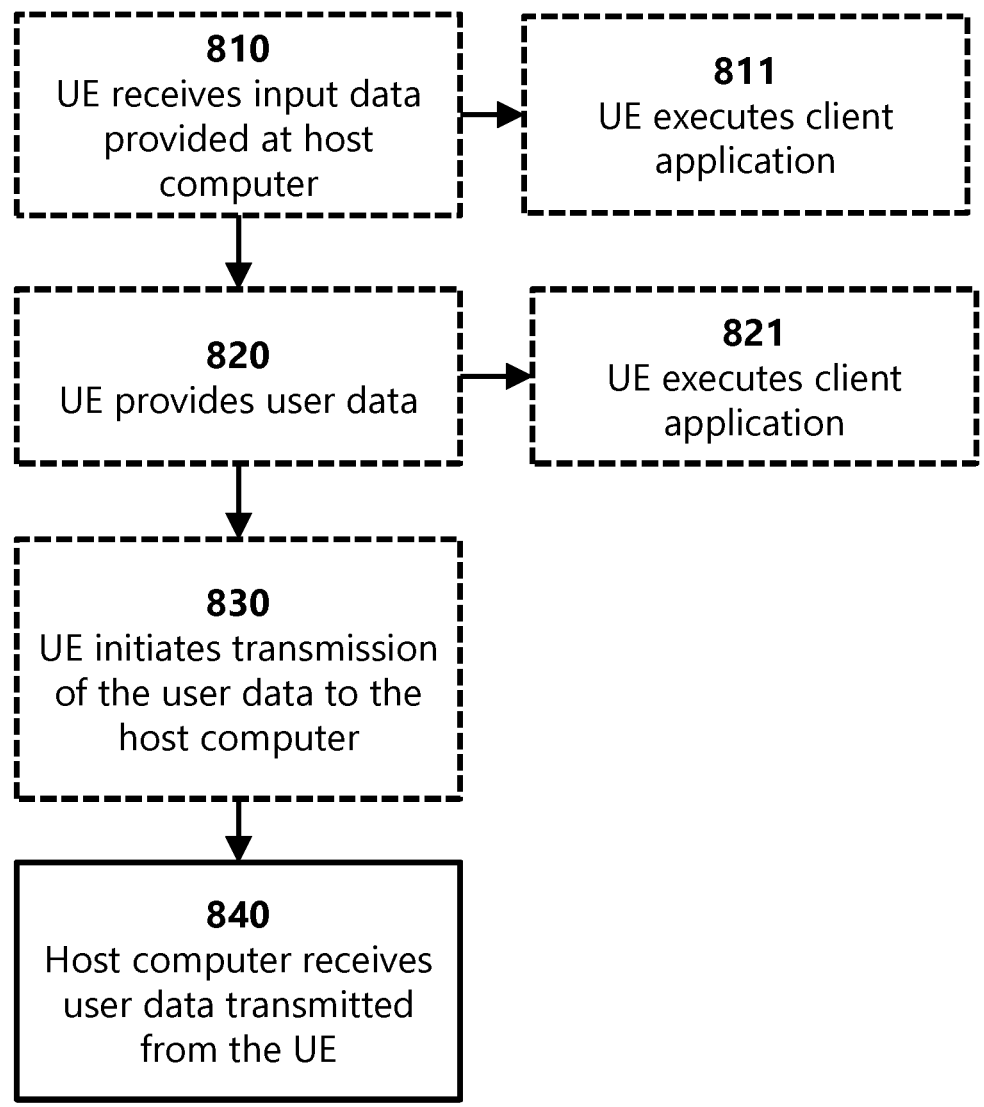
FIG. 15 is a flowchart illustrating a method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 16:
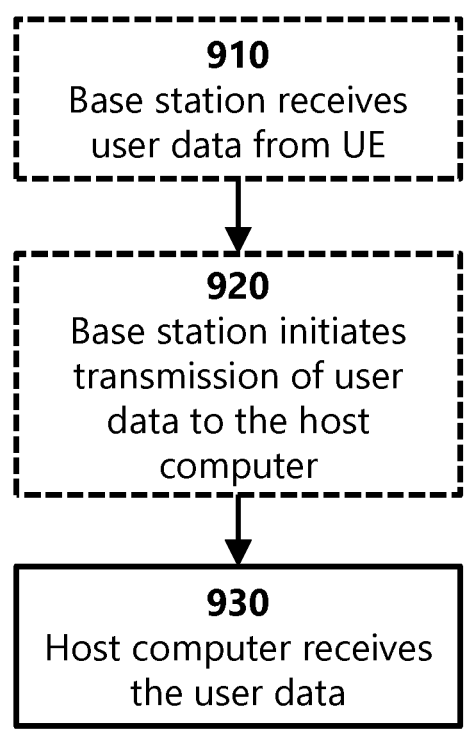
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order. The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:

| Abbreviation | Explanation |
|---|---|
| 3GPP | Third Generation Partnership Project |
| BLER | Block Error Rate |
| BS | Base Station |
| BTS | Base Transceiver Station |
| D2D | Device to Device |
| DCI | Downlink Control Information |
| DMRS | Demodulation Reference Signal |
| DL | Downlink |
| eNB | eNodeB |
| EVM | Error Vector Magnitude |
| FFT | Fast Fourier Transform |
| GHz | Giga Hertz |
| kHz | Kilo Hertz |
| LTE | Long Term Evolution |
| M2M | Machine to Machine |
| MBB | Mobile Broadband |
| MIMO | Multi-Input Multi-Output |
| MTC | Machine Type Communication |
| NR | New Radio |
| OFDM | Orthogonal Frequency Division Multiplex |
| PRB | Physical Resource Block |
| RAN | Radio Access Network |
| RAT | Radio Access Technology |
| RB | Resource Block |
| RNC | Radio Network Controller |
| RPF | Repetition Factor |
| RRC | Radio Resource Control |
| RRH | Remote Radio Head |
| RRU | Remote Radio Unit |
| RX | Receive |
| SINR | Signal to Interference and Noise Ratio |
| sPUSCH | Short Physical Uplink Shared Channel |
| sTTI | Short Transmission Time Interval |
| TDD | Time Division Duplex |
| TX | Transmit |
| UE | User Equipment |
| UL | Uplink |
| URLLC | Ultra Reliable Low Latency Communication |
| Usec | Micro Seconds |
| UTRAN | Universal Terrestrial Radio Access Network |
| V2V | Vehicle to Vehicle |
| V2X | Vehicle to Infrastructure |
| WAN | Wireless Access Network |

What is claimed is:

1. A master node, MN, for measurement gap configuration, the MN comprising:
processing circuitry configured to:
operate in a dual connectivity, DC, configuration with a secondary node, SN, and a wireless device; and
configure a measurement gap configuration for the wireless device, wherein the measurement gap configuration allows the wireless device to measure a first frequency range, FR1, and a second frequency range, FR2; and
interface circuitry operably coupled to the processing circuitry, the interface circuitry configured to transmit the measurement gap configuration to the wireless device;

wherein the processing circuitry is further configured to determine that the wireless device uses a separate radio frequency, RF, chain for FR1 and FR2; and wherein the interface circuitry is further configured to receive a message from the SN, the message requesting that the MN modify at least one of a first measurement gap configuration for FR1 and a second measurement gap configuration for FR2 of the wireless device.

2. The MN of claim 1, wherein the interface circuitry is further configured to communicate to the SN, that the SN does not have to setup the measurement gap configuration for the wireless device.

3. The MN of claim 1, wherein the interface circuitry is further configured to communicate the first measurement gap configuration for FR1 and the second measurement gap configuration for FR2 to the SN.

4. The MN of claim 1, wherein the processing circuitry is further configured to change the first measurement gap configuration and/or the second measurement gap configuration to a new configuration, and wherein the interface circuitry is further configured to communicate the new configuration to the SN.

5. The MN of claim 1, wherein the interface circuitry is further configured to receive a notification from the SN, the notification informing the MN that the SN added or removed a serving cell that is using one or more frequencies in FR1 and/or FR2.

6. A master node, MN, for measurement gap configuration, the MN comprising:
 processing circuitry configured to:
  operate in a dual connectivity, DC, configuration with a secondary node, SN; and
  configure a first measurement gap configuration for a first frequency range, FR1, only, wherein the first measurement gap configuration allows the wireless device to measure FR1; and
 interface circuitry operably coupled to the processing circuitry, the interface circuitry configured to transmit the first measurement gap configuration to the wireless device;
 wherein the processing circuitry is further configured to determine that the wireless device uses a separate radio frequency, RF, chain for FR1 and a second frequency range, FR2; and
 wherein the interface circuitry is further configured to receive a message from the SN, the message requesting that the MN modify the first measurement gap configuration for FR1.

7. The MN of claim 6, wherein the interface circuitry is further configured to:
 communicate to the SN that the wireless device uses the separate RF chain for FR1 and FR2 and that the SN is to configure the measurement gap configuration for FR2; and/or
 communicate the measurement gap configuration for FR1 to the SN.

8. The MN of claim 6, wherein the processing circuitry is further configured to change the measurement gap configuration for FR1 to a new configuration; and the interface circuitry is further configured to communicate the new configuration to the SN.

9. The MN of claim 6, wherein the interface circuitry is further configured to:
 receive a first notification from the SN, the first notification informing the MN that the SN modified the measurement gap configuration of the wireless device for FR1; and/or
 receive a second notification from the SN, the second notification informing the MN that the SN added or removed a serving cell that was using a frequency in FR1.

10. A secondary node, SN, for measurement gap configuration, the SN comprising:
 processing circuitry configured to operate in a dual connectivity, DC, configuration with a master node, MN, and a wireless device; and
 interface circuitry operably coupled to the processing circuitry, the interface circuitry configured to receive a message from the MN, the message associated with a configuration of at least one of a first measurement gap configuration for a first frequency range (FR1) and a second measurement gap configuration for a second frequency range (FR2) for the wireless device;
 wherein the processing circuitry is further configured to determine a new configuration for at least one of the first measurement gap configuration for FR1 and the second measurement gap configuration for FR2; and
 wherein the interface circuitry is configured to communicate a request to modify the measurement gap configuration of at least FR1 and FR2 to the MN.

11. The SN of claim 10, wherein the message indicates that the SN does not have to setup the measurement gap configuration for either FR1 or FR2 for the wireless device.

12. The SN of claim 10, wherein the interface circuitry is further configured to receive a message from MN, the message indicating the measurement gap configuration is for both FR1 and FR2.

13. The SN of claim 10, wherein the message indicates that the wireless device uses a separate radio frequency (RF) chain for FR1 and FR2, and the interface circuitry is further configured to receive a notification from the MN that the SN is responsible for configuring the measurement gap configuration for FR2.

14. The SN of claim 13, wherein the interface circuitry is further configured to receive the measurement gap configuration for FR1 from the MN.

15. The SN of claim 10, wherein the processing circuitry interface circuitry is further configured to change the measurement gap configuration for FR2 to a new configuration and the interface circuitry is further configured to communicate the new configuration to the MN.

16. The SN of claim 10, wherein the interface circuitry is further configured to receive a message from the MN, the message indicating a new configuration of the wireless device, wherein the new configuration comprises at least one of a changed measurement gap configuration for FR1 and a changed measurement gap configuration for FR2.

* * * * *

UNITED STATES PATENT AND TRADEMARK OFFICE
CERTIFICATE OF CORRECTION

PATENT NO. : 10,601,556 B2
APPLICATION NO. : 16/255188
DATED : March 24, 2020
INVENTOR(S) : Teyeb et al.

Page 1 of 1

It is certified that error appears in the above-identified patent and that said Letters Patent is hereby corrected as shown below:

On the Title Page

Item (72), under "Inventors", in Column 1, Line 1, delete "Solna (DE);" and insert -- Solna (SE); --, therefor.

Item (63), under "Related U.S. Application Data", in Column 1, Line 2, delete "PCT/EP2018/051180," and insert -- PCT/SE2018/051180,. --, therefor.

In the Specification

In Column 1, Line 8, delete "Nov. 16, 2018," and insert -- Nov. 16, 2017, --, therefor.

In Column 1, Line 30, delete ""multi-carrier" transmission" and insert -- "multi-carrier transmission" --, therefor.

In Column 2, Line 16, delete "and" and insert -- an --, therefor.

In Column 10, Line 18, delete "and" and insert -- an --, therefor.

In Column 16, Line 27, delete "(CPE)." and insert -- (CPE), --, therefor.

In Column 19, Line 58, delete "herein, Of" and insert -- herein, of --, therefor.

In Column 28, Line 45, delete "1402," and insert -- 1404, --, therefor.

In Column 30, Line 41, delete "according one" and insert -- according to one --, therefor.

In Column 31, Lines 20-21, delete "according one" and insert -- according to one --, therefor.

In Column 36, Line 56, delete "substep 830" and insert -- step 830 --, therefor.

Signed and Sealed this
Thirtieth Day of June, 2020

Andrei Iancu
*Director of the United States Patent and Trademark Office*